United States Patent [19]

Böhm et al.

[11] 4,412,122
[45] Oct. 25, 1983

[54] METHOD FOR WELDING BODIES MADE OF VERY HARD OR GREATLY REFINED ARMORED STEEL, RESPECTIVELY, AND STRUCTURES MADE ACCORDING TO THIS METHOD

[75] Inventors: Günter Böhm, Witten; Wolfram Funk, Groshansdorf, both of Fed. Rep. of Germany

[73] Assignee: Thyssen Industrie Ag Maschinenbau, Witten, Fed. Rep. of Germany

[21] Appl. No.: 926,962

[22] Filed: Jul. 10, 1978

[30] Foreign Application Priority Data

Jul. 8, 1977 [DE] Fed. Rep. of Germany ....... 2730826

[51] Int. Cl.$^3$ ............................................. B23K 35/34
[52] U.S. Cl. ...................... 219/137 R; 219/137 WM; 219/146.23; 228/231
[58] Field of Search ........................... 219/137, 146.23; 228/231

[56] References Cited

U.S. PATENT DOCUMENTS

| | | | |
|---|---|---|---|
| 2,810,818 | 10/1957 | Rottschild et al. | 219/146.23 |
| 3,139,514 | 6/1964 | Kaesmacher | 219/146.23 |
| 3,700,851 | 10/1972 | Björkroth | 219/137 |

FOREIGN PATENT DOCUMENTS

| | | | |
|---|---|---|---|
| 780542 | 8/1957 | United Kingdom | 219/146.23 |
| 620358 | 2/1977 | U.S.S.R. | 219/146.23 |

*Primary Examiner*—Brooks H. Hunt
*Attorney, Agent, or Firm*—Spencer, Kaye & Frank

[57] ABSTRACT

A method for welding bodies made of very hard or highly refined armor steel, particularly objects to be armored against the penetration of projectiles, flying bodies, splinters or the like, wherein armor steel bodies arranged in juxtaposition with a gap therebetween are provided, in the region of the root of the joint, with preferably one bar each, and/or a filler body of, in particular, an unalloyed steel is arranged in the joint so as to cover the joint gap. The armor steel bodies are welded together without preheating with a suitable ferritic welding material, of like base, under a protective gas atmosphere and after cooling of the weld seam from the welding heat to not less than 100° C., the weld seam is heated locally and progressively without any holding period to at least 450° C. and subsequently, without maintaining a certain ambient temperature and/or period of time, the weld seam is cooled to ambient temperature in air. Alternatively, a like-base layer of armor is locally applied onto a wall of armor steel from a suitable ferritic welding material in that the welding area, which has been cooled from the welding heat to no less than 100° C., is heated locally and progressively without any holding period to at least 450° C., and subsequently the weld region is cooled in air without maintaining a certain time period and only the last (uppermost) welded layer of the weld region is again locally reheated, before being cooled from the welding heat to below 100° C., at least 450° C. without holding period and subsequently again cooled in air to ambient temperature without maintaining a cetain time period and or temperature.

35 Claims, 106 Drawing Figures

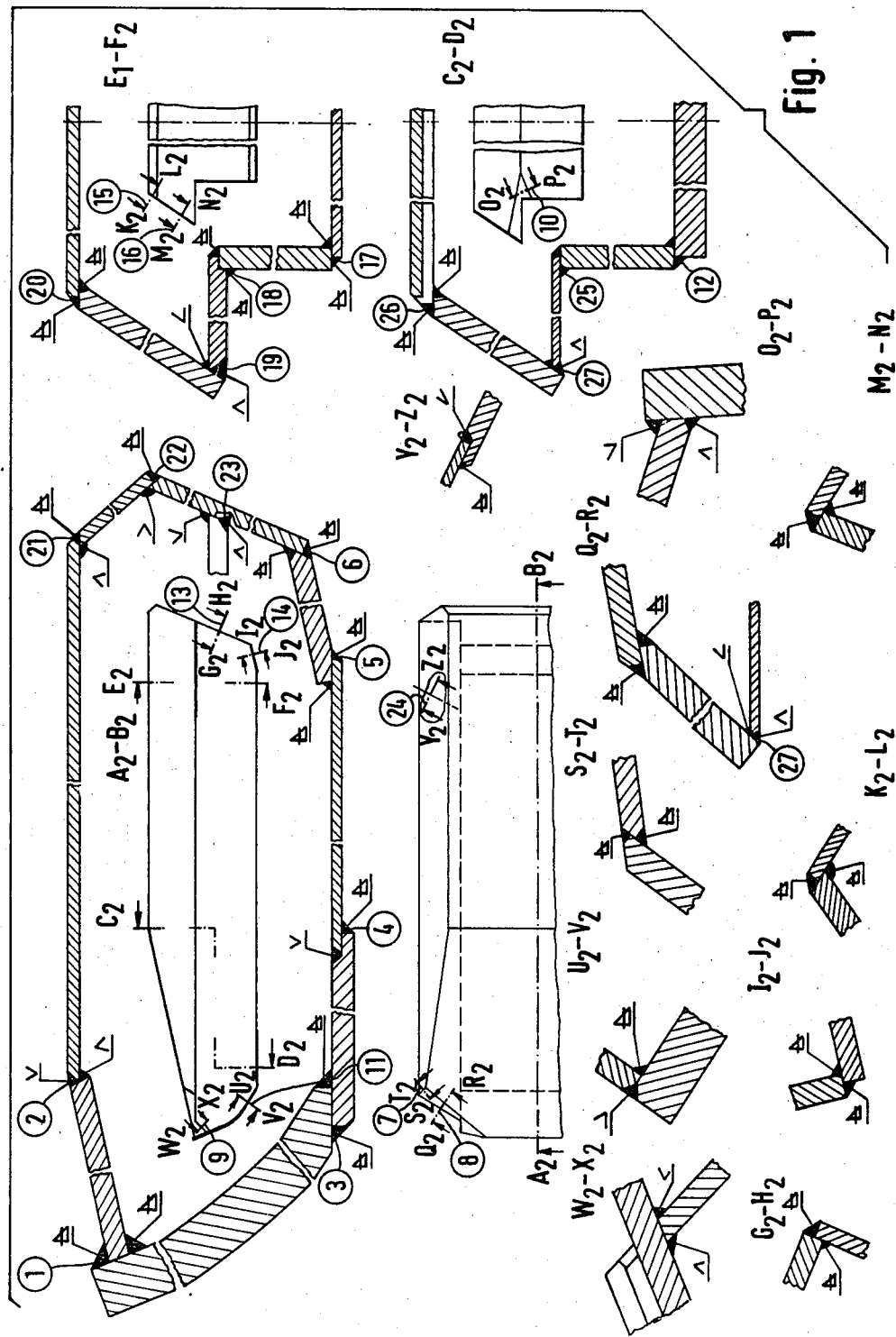

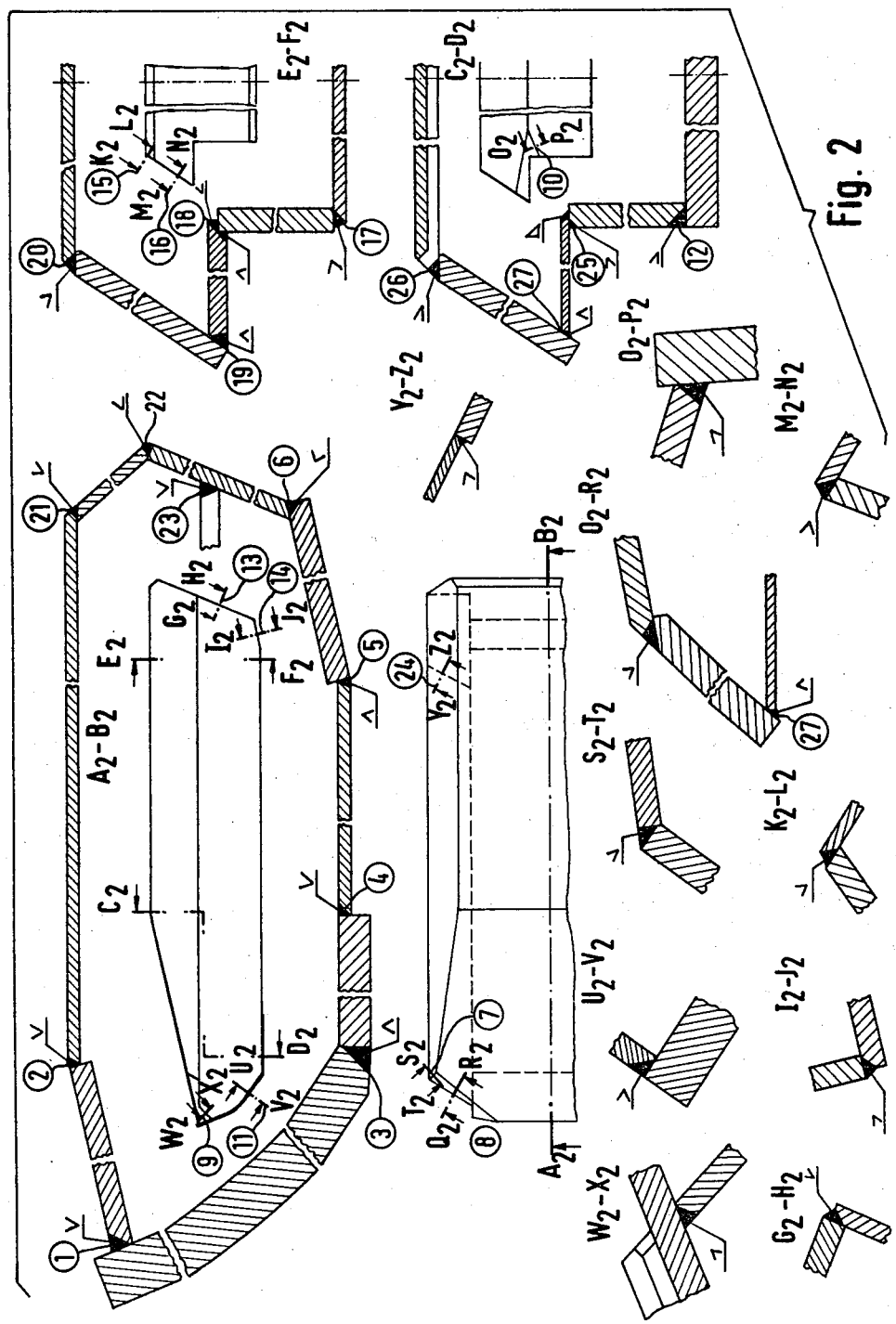

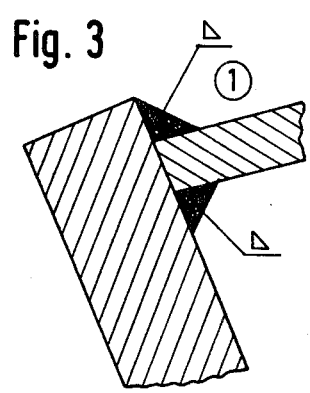
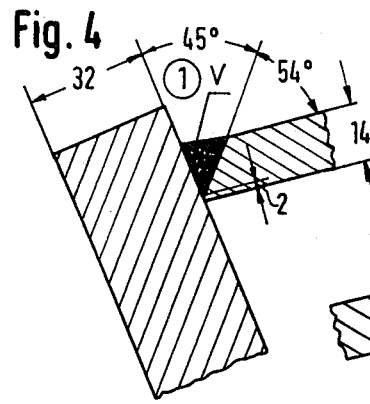
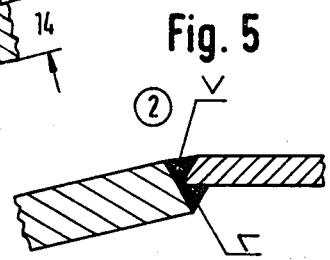
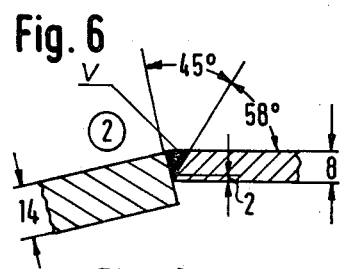
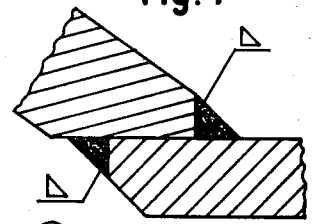
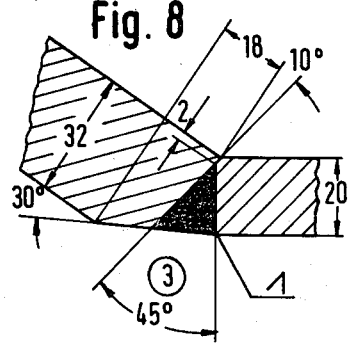
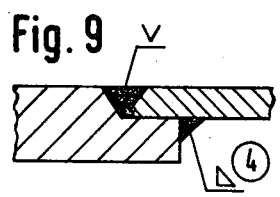
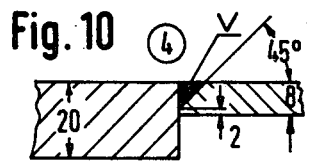
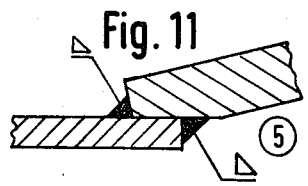
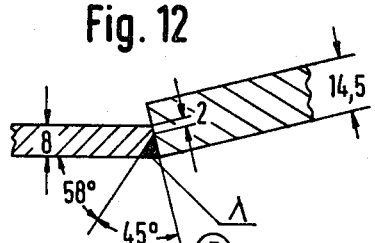
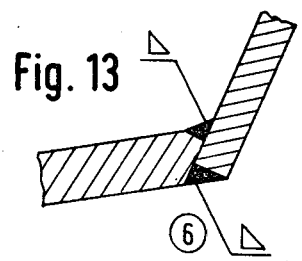
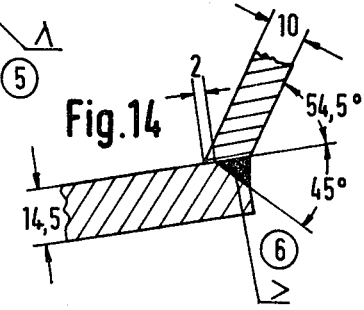

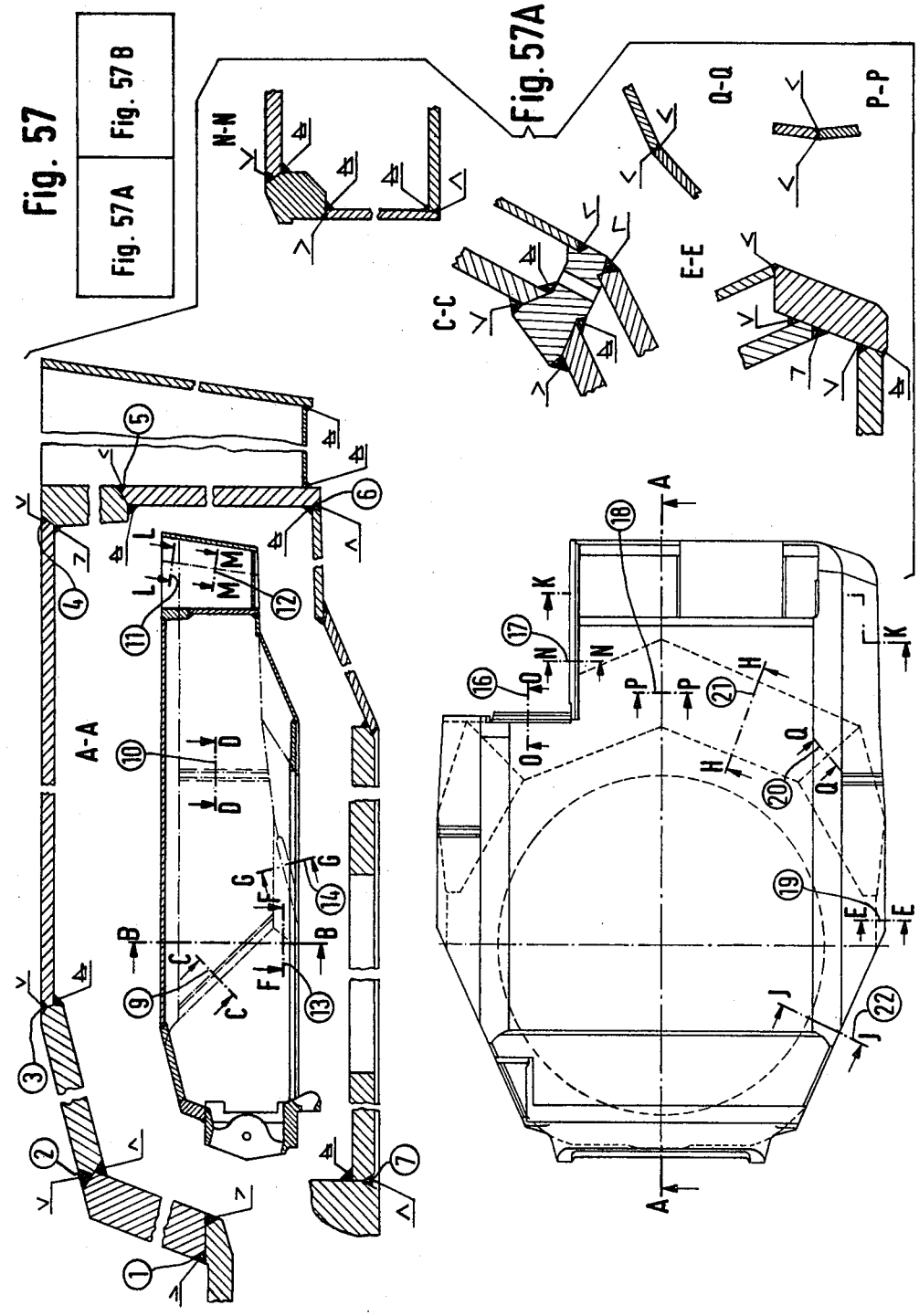

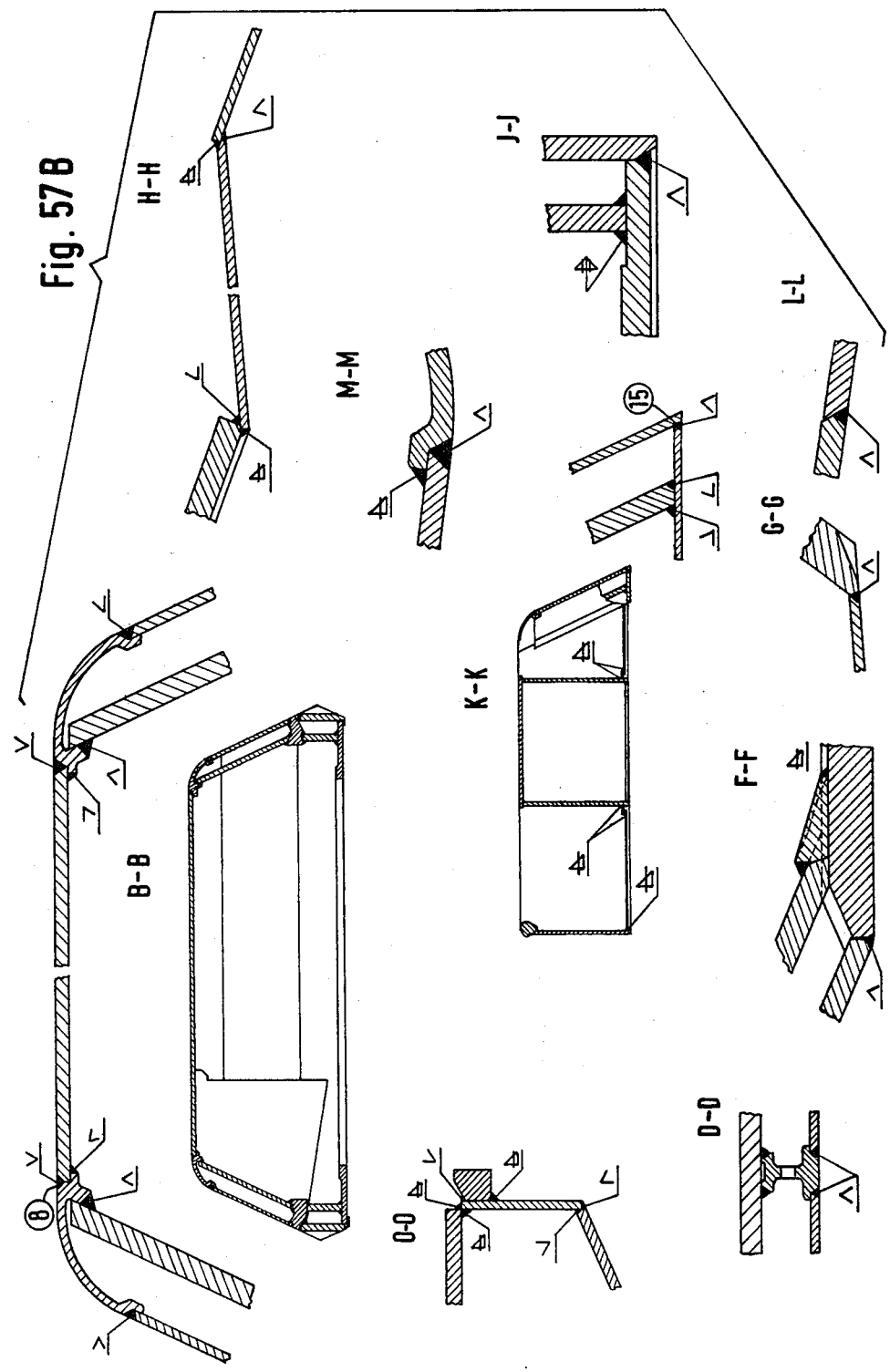

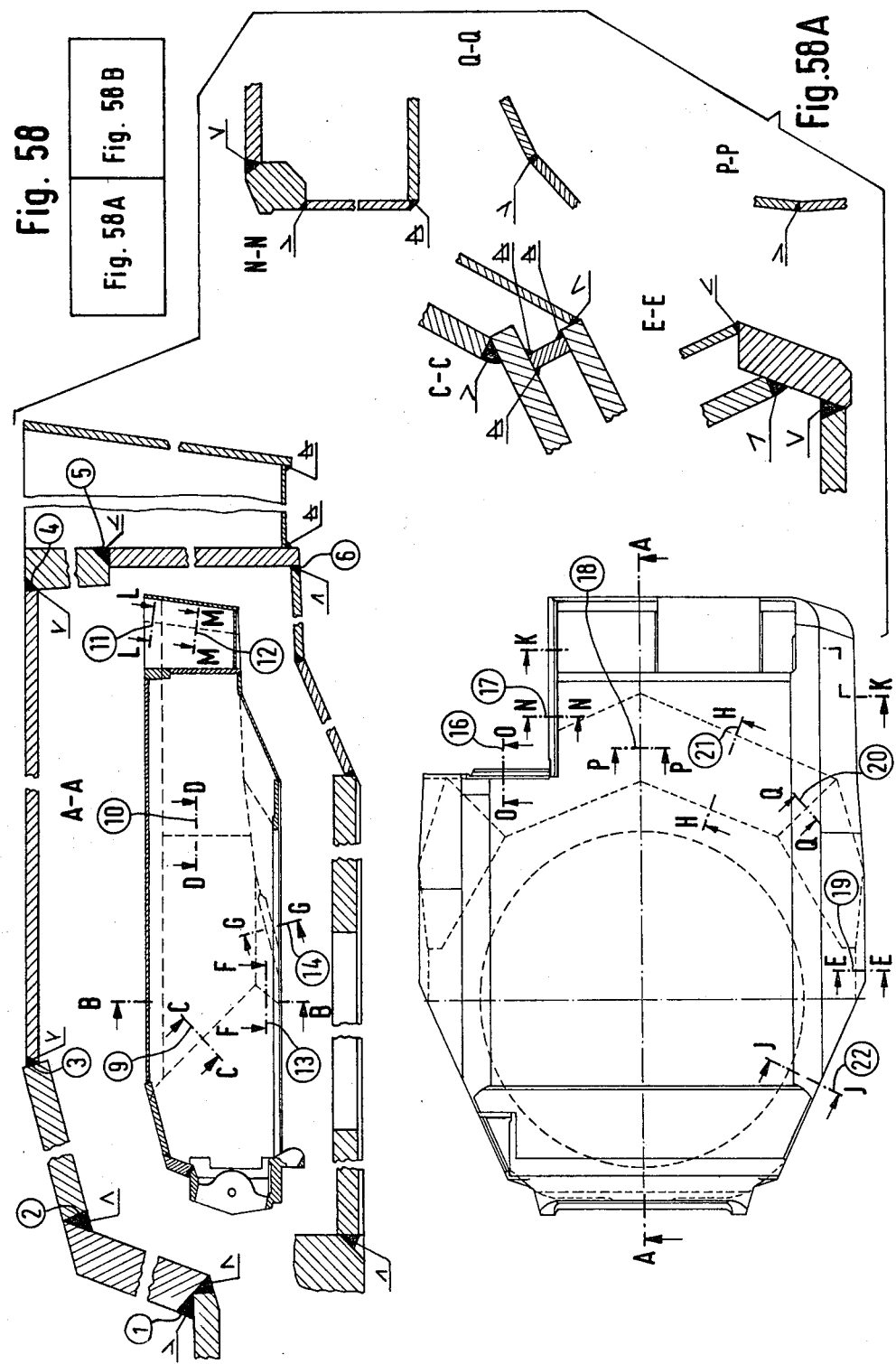

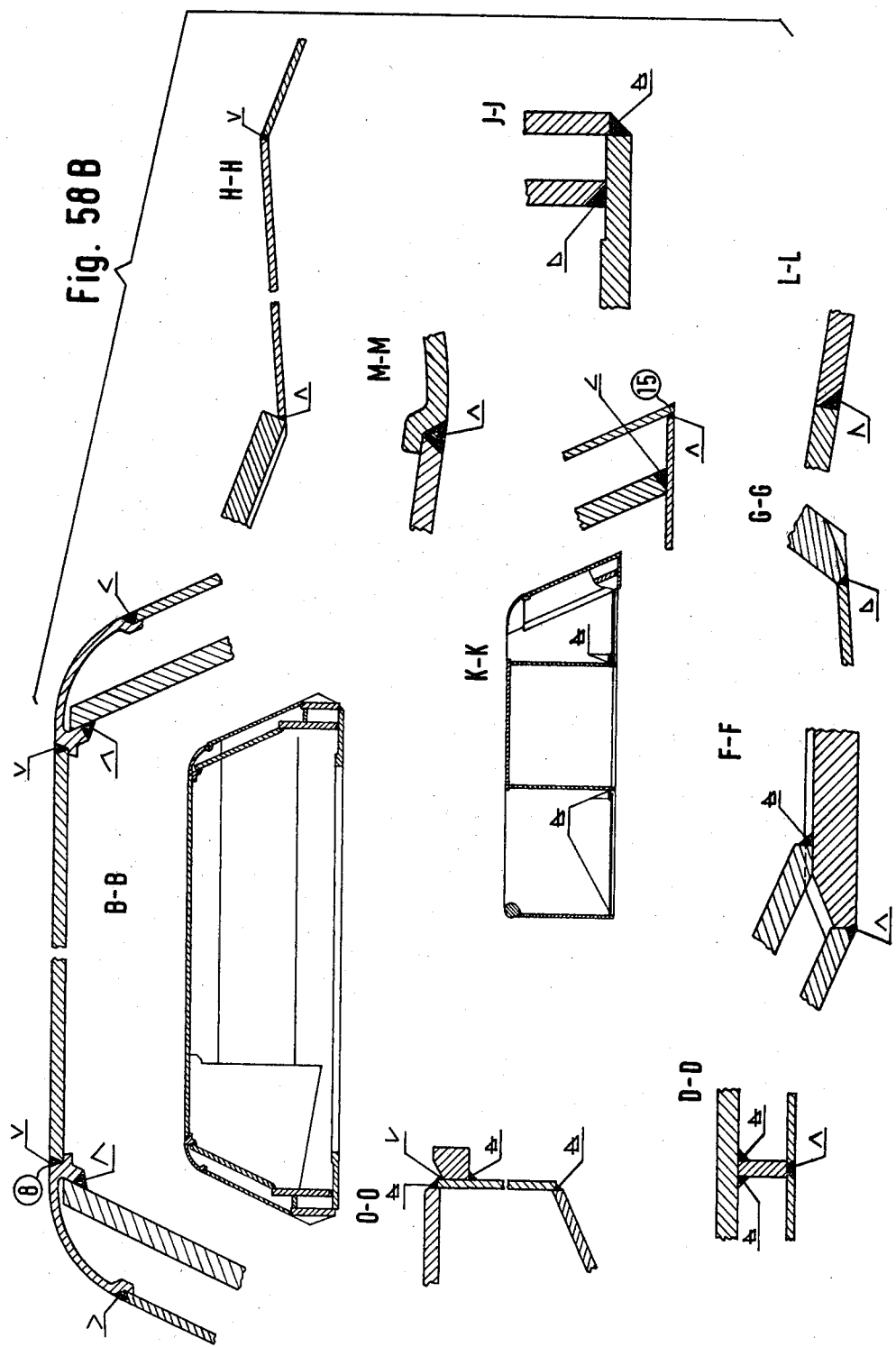

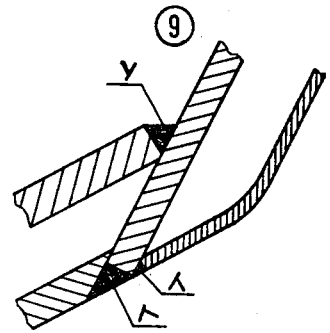

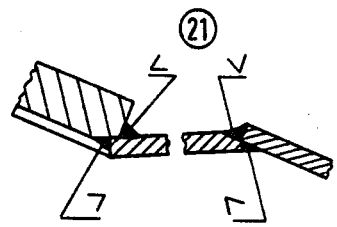
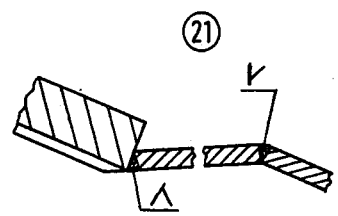
Fig. 99　　　　　Fig. 100
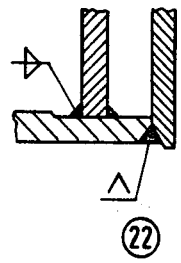
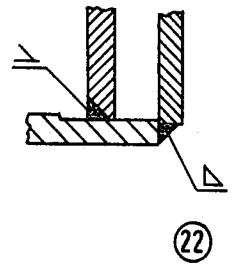
Fig. 101　　　　　Fig. 102
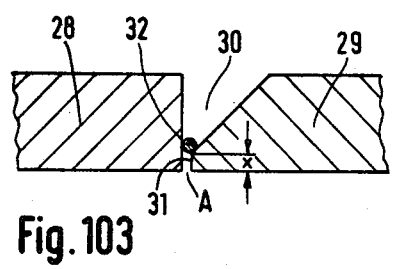
Fig. 103
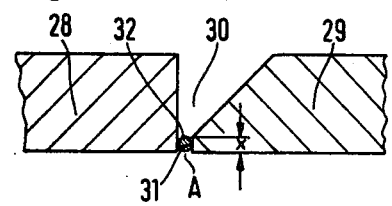
Fig. 104
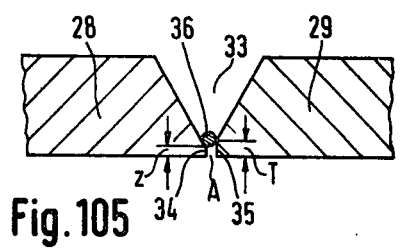
Fig. 105
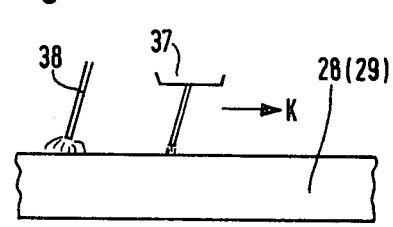
Fig. 106

METHOD FOR WELDING BODIES MADE OF VERY HARD OR GREATLY REFINED ARMORED STEEL, RESPECTIVELY, AND STRUCTURES MADE ACCORDING TO THIS METHOD

The conventionally employed armor steels having a martensitic base receive their high resistance to the penetration of projectiles or the like from their great hardness which, in turn, is determined by the relatively high carbon component of these materials. Such high carbon-content steels are extremely difficult to work with when welding. For decades it has been customary to weld connections at such high carbon content steels with austenitic filler materials so that the sheet metal parts or components to be welded together were not connected in kind. This has the result that a zone of austenitic (unlike base) material is formed between the individual components or sheets or armor steel, which zone, due to the properties of the austenites, has only a comparatively low stability (hardness) but great ductility. From this, there is expected to result a reduction in the inevitably produced inherent welding strains from plastic deformations in the region of the weld seam. This technology has for years determined the structural features of welded pit and turret housings in armored vehicles or tanks. Due to the above-mentioned characteristics of the austenitic weld seams it became necessary to design the structures in such a way that substantial forces, particularly those resulting from combat action or operation, would not be absorbed exclusively through the weld seams. Rather, the structures were designed so that the sheet metals or components to be connected were mutually supported in such a manner that the forces did not flow only through the weld seams. It was further necessary to design the structure of the weld seams in such a manner that direct firing on the weld seams was impossible. This was accomplished in that the weld seams were protected, if possible, by a cover of armor steel. A further result of the above-mentioned technology is that butt joints or similar connections of sheet metals made of armor steel must be avoided by any means since the region of the weld seam has a lower resistance to enemy fire than the unwelded sheet metal so that these points would constitute a particularly weak point of the structure.

Attempts have also been made to weld armor steel ferritically. These efforts have not yet produced satisfactory results. In particular, it has not yet been possible to weld ferritically without producing cracks, so that the use of ferritically welded seams had to be avoided where forces flow or at points that are particularly endangered by enemy fire.

Tests on weld connections of Russian tanks have shown that a noticeably soft welding material was used for all thicknesses of sheet metal. Consequently, this technique can also not be used to change the prior art manner of constructing, for example, pits and turrets.

It is the object of the present invention to provide a welding method for the like-base connection of sheet metals, profiles, forged or cast members of armor steel wherein the seam region has at least almost the same hardness as the respective base material being connected and thus assures practically the same protection against enemy fire. Furthermore, the method according to the invention is to be suitable as well for deposition welding on armor steels or to armor certain regions by deposition welding on armor steels. Finally, it is the object of the invention to provide an advantageous weld structure which can be used to particular advantage for armored vehicles or tanks, respectively.

Regarding the method, the problem on which the invention is based is solved by the features defined in claim 1.

The method according to the invention permits for the first time the crack-free, like-base welding of bodies made of armor steels. The weld region or the weld seam, respectively, has practically the same hardness as the base material (armor steel) of the armor steel bodies which are to be connected together. Thus the characteristic particularities of prior art weld structures of armor steel lose their significance. Rather, the engineer can now produce a structure of armor steel bodies in the same manner, with respect to the weld connections, as is customary, for example, for the production of steel building structures or for structures in the machinery construction art. This at least in part substantially simplifies these structures which also results in manufacturing simplifications. When the like-base welding method is used for groups of components and structures of armor steel, these simplifications are essentially that now butt joints can also be produced without difficulty, the weld seam having practically the same hardness as the base material. An additional support of the armor steel bodies to be welded together is not necessary. Moreover, the weld seams need no longer be covered by armor steel. Thus, presently sometimes rather complicated profiles and coverings can be eliminated. Weld seams produced according to the invention can also be subjected to direct hits since they practically have the same hardness as the base materials of the armor steel bodies. Moreover, the use of fillet welds, double bevel butt welds and the like is no longer necessary.

If the method of the present invention is used to weld groups of components or other structures of armor steel bodies, the number of the presently required weld seams can generally be reduced to one weld seam. Although this sometimes results in a greater weld seam volume for the one weld seam, in most cases the preparation of the seam is simplified considerably. Moreover, welding of a seam having a larger volume is generally more effective than the production of a plurality of smaller weld seams which generally must be made in the form of fillet welds.

A further advantage is that the requirements with respect to the assembling accuracies to be maintained are much lower than in the prior art methods, since in the invention the armor steel bodies can easily be placed with a considerable gap between them. This means in all cases a significant simplification of assembly which is likewise reflected by lower costs. In this connection it can be stated quite generally that the like-base welding of armor steel according to the invention is substantially independent of the gap to be bridged. In order to produce defined conditions in the region of the root, the invention proposes to dispose a filler body at this point to cover the gap in the bottom of the joint. Additionally or instead, the armor steel bodies may also be provided with bars so that in this way or in conjunction with the filler body the welding material will definitely not drop through during welding. For heavier armor steel bodies with a thickness of, for example, more than 30 mm, these bars can possibly be eliminated since the walls of the joint dissipate sufficient heat during welding. If a filler body, for example, a welding wire, is used, this body is also melted and results in a perfect and accurate welding of the root so that no further work is required. The present invention completely eliminates the need for grooving out the root and counterwelding of a cap layer.

FInally, it must also be considered that the ferritic welding material is substantially less expensive, for example only about a third of the price of the previously employed austenitic welding filler.

When the method of the invention is used, intermediate stress relieving is not necessary. Rather, it has been found that in the method proposed by the invention cooling can be effected to about 100° C without any danger. The reason for this is that no significant internal tensile strains have been able to build up by then. If, according to the method of the invention, after welding and cooling down to about 100° C., the object is immediately reheated to at least 450° C., no cracks develop, not even after longer periods of time, for example months. According to our own examinations, macroscopic internal strains in the weld seam are reduced to a greater extent only at temperatures above about 550° C. However, older X-ray examinations have shown that microscopic internal strains are completely reduced already at temperatures up to 500° C. It must therefore be presumed that the heat affected zone of the weld seam possess high microstrains and thus normally cracks occur with preference in that zone. Since freely shrinking connections often remain free of cracks, macro and micro strains must coact. It is known that the higher the microstrains, the greater is the danger of cracks. But if the microstrains are reduced, even greater macrostrains can obviously not lead to breakage. Stress relief at about 450° to 550° C. as used in the method of the invention therefore with certainty avoids cracking.

Since for reasons of manufacturing procedure preheating is practically impossible when welding armor steel, the method of the invention has been developed in such a way that welding can be effected without preheating.

When the method according to the invention is used, the armor steel bodies to be welded together need be prepared only by means of oxyacetylene cutting. The type of gas employed has no influence. Before welding according to the method of the invention, the sides of the seam are merely descaled.

If, in the present application, the term "partial annealing" is used, this is intended to mean that weld material and heat-affected zone are heated locally to a certain temperature for but a short time—usually by means of a so-called multiple-nozzle torch. The attainment of the given minimum temperature can best be monitored by means of thermocolor pins. Such temperature need not be maintained for any particular period of time.

The use of a filler body to cover the gap at the bottom of the joint also produces a secure guidance for the torch so that even unskilled welders can properly weld armor steel bodies. This results in a further advantage that no sharp notches are made if the root is not welded through. The transverse dimensions of the filler body should corrrespond to the width of the gap.

For the case where, in the use of the method according to the invention, the root is counterwelded, it must not be ground out or grooved out since coarser flaws are safely melted away. Consequently, the costs for grinding or grooving can be eliminated without question.

No pores develop if the liquid weld material is drawn and not pushed over the gap as defined in claim 2.

If, according to claim 3, $CO_2$ is used as the protective gas, a weld completely free of pores can be attained with certainty, particularly if a tubular wire electrode is used simultaneously.

Often it becomes necessary to interrupt welding work. To nevertheless be able to weld together armor steel bodies on a like base and with particularly the same hardness in the weld seam, claim 4 provides a detailed teaching for technical and planning action.

The method according to the invention can be practiced with particular ease in its further embodiment as defined in claim 5.

If, according to claim 6, the groove regions are locally annealed after the flame cutting step by means of an immediately following burner, for example a so-called multiple-nozzle torch, no problems from cracks will result in the region of the joint.

Even relatively thin armor steel bodies can be securely welded together in the embodiment of claim 8 without there being any danger of the root falling through during welding.

According to claim 10, the armor steel bodies to be welded together may be arranged with a considerable gap between them. When the method according to the invention is used, certain dimensional and assembly inaccuracies are no longer important.

The mode of operation defined in claim 12 is particularly advantageous because dropping of the root during welding is here excluded with certainty. The welder has a secure guide for the torch at every point in the joint in the form of the filler body and can smoothly draw the liquid welding material over the filler body.

If the mode of operation according to claim 13 is used, the costs are relatively low since no complicated filler body need be produced. Rather, the conventional, unalloyed welding wire is sufficient which has a diameter corresponding to the gap width and is inserted into the root of the joint so that it rests on the facing side walls of the weld joint and cannot fall through the gap. This filler body also prevents the formation of spatters. Moreover, the electric arc burns more quietly.

In commercially available, lowly alloyed ferritic rod electrodes, internal strains occur in the region of the weld seam which are reduced only slightly by annealing below about 620° C. The welding material of these electrodes obviously tends to become brittle with heat so that the stress relief is limited by high creep time limits. For that reason, claim 14 expressly prescribes that for welding by means of ferritic fillers, the welding material employed should have a low to very low creep limit. This also reduces the susceptibility to cracking.

The influence of dilution with the base material is determined mainly by the carbon content which is of decisive influence on the degree of hardness attained. The other elements charge according to the alloying difference between filler wire and base material. By adding burnt-in carbon and using welding material with carbide forming elements, the hardness is sometimes increased greatly. Along the sides of the seam, the dilution ratio remains the same, while in the center of the seam it decreases with increasing height of the seam. In order to somewhat soften the influence of carbon by changing the dilution with increasing thickness of the sheet metal, fillers with low carbon content should be used. Protective gas welds with tubular wires would here be particularly applicable which produce carbon contents of 0.02% in the unmixed welding material.

Claim 15 contains this realization and points out the need for its consideration when using an exemplary mode of operation.

Claim 17 describes a mode of operation which is particularly suitable for welding thin armor steel sheets of, e.g. 14.5 mm by means of manual welding. As has been shown, the use of this method permits the secure welding of considerable joint gaps of, e.g., 2 or 3 mm, by manual welding, the weld seam again having practically the same hardness values as the base materials.

Claim 18 provides further detailed instructions for the method, a rod electrode having a diameter of 4 mm being used preferably for the root layer while the filler layers can be welded with a rod electrode of 5 mm diameter.

Claim 19 provides a further detailed instruction for welding bodies of armor steels having a hardness up to about 120 kp/mm$^2$, while claim 20 describes an advantageous mode of operation for armor steel bodies having a hardness of more than 120 kp/mm$^2$.

Claims 22, 23 and 24 describe further advantageous modes of operation, the modes according to claims 21 and 22 resulting in hardnesses in the weld seams, particularly for welded joints, which correspond practically to the base materials while the mode of operation according to claim 23 is suited for deposition welding as well as for junction welding.

The method according to the invention also makes it possible to armor certain regions of an object to be armored, for example the nose of a tank, by deposition welding, this deposition welding producing practically the same hardness characteristics as the base material. This is also important for repair work. Claim 24 describes an advantageous mode of operation for deposition or repair welds.

Particularly favorable results in junction welds have been attained with the mode of operation defined in claim 26.

A further preferred mode of operation is defined in claim 27. With this mode of operation it is possible not only to weld a large seam volume within the shortest time, but in conjunction with a $CO_2$ atmosphere it is also possible to weld completely without pores and cracks, such weld seams likewise having practically the same hardness characteristics as the bodies made of armor steel.

Claim 27 contains detailed parameters (sheet metal thickness, wire diameter) for welding armor steel bodies.

According to claim 29, the weld seams can be made with the smallest possible seam volume. This keeps welding stresses low.

Claim 31 describes a solution for producing a welded structure according to the method of the invention. Accordingly, weld seams on tanks or armored vehicles where the seams are exposed directly to enemy fire may be produced without a cover of armor steel.

According to claim 32, the armor steel bodies may be welded together by means of V-type seams, double-V welds with relatively small opening angles of, e.g. 30° to 50°, while for a single bevel butt weld the opening angle must be at least 45°. The preferred weld for use with the method of the invention will be the V-type weld. The very small opening angles of about 30° to 50° produce very good results regarding welding technique, particulary with a gap width of 2 mm and a bar height of 2 mm. Compared to a single bevel butt weld, such a seam has the smaller seam volume.

Claims 33 to 35 describe preferred seam cross sections in dependence on the thickness and the shape of the seam in the armor steel bodies.

In the drawings, the invention is illustrated—in part schematically—in numerous embodiments. It is shown in:

FIG. 1 is a system drawing of the pit of a Marder armored personnel carrier in which the position of the major seams, the preparation of these seams as well as the structural configuration of the major seams can be seen.

FIG. 2 is a like illustration of the pit of the Marder armored personnel carrier in which, however, the seams are welded according to the invention, that is on a like base.

FIGS. 3 to 56 show details from both FIGS. 1 and 2, to a larger scale, in section.

FIG. 57 is a system drawing of the welded turret of the Leopard battle tank, in section, showing the position of the major weld seams according to the prior art.

FIG. 58 is a system drawing of the turret of the Leopard battle tank, in section, showing the major weld seams which, however, are welded according to the method of the invention.

FIGS. 59 to 102 show details from both FIGS. 57 and 58 to a larger scale, likewise in section.

FIGS. 103 to 105 are cross-sectional views of armor steel sheets which have been prepared for welding; and FIG. 106 is a schematic side view of a device for welding according to the method of the invention.

Figure 15:
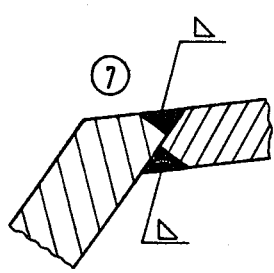

In the drawing, the invention is shown for use on the pit of the Marder armored personnel carrier and on the welded turret of the Leopard battle tank. For a better overview, the prior art welded structures in the pit of the Marder armored personnel carrier or in the welded turret of the Leopard armored personnel carrier are shown in FIGS. 1 and 57. The major seams are numbered consecutively with the reference numerals 1 through 27 and for reasons of clearer emphasis these references numerals have been encircled.

FIGS. 2 and 58 show the novel structures for the pit of the Marder armored personnel carrier or the welded turret of the Leopard tank, respectively, as they have become possible with the use of the present invention. For reasons of facilitating comparisons, the major seams have again been given the same consecutive reference numerals in system drawings 2 and 58 as are used in the system drawings of FIGS. 1 and 57. Moreover, these references numerals for the major seams have again been encircled to emphasize them more clearly.

Figure 56:
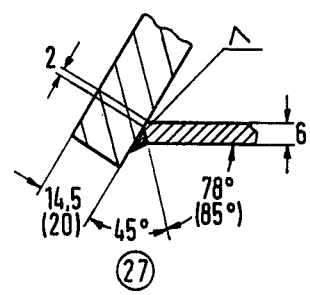

FIGS. 3 through 56 show clearly the major seams of the pit of the Marder armored personnel carrier shown in FIGS. 1 and 2, with FIGS. 3, 5, 7, 9, 11, 13, 15, 17, 19, 21, 23, 25, 27, 29, 31, 33, 35, 37, 39, 41, 43, 45, 47, 49, 51, 53 and 55, showing the structures required for martensitic welding, that is unlikebase welding, while FIGS. 4, 6, 8, 10, 12, 14, 16, 18, 20, 22, 24, 26, 28, 30, 32, 34, 36, 38, 40, 42, 44, 46, 48, 50, 52, 54 and 56, show the corresponding structural detail for welding according to the welding method of the invention, where the armor steel body (walls) is welded together on a like base.

For reasons of a better overview, the same reference numerals were again used for the major weld seams in FIGS. 57 and 58, i.e. the major weld seams were again numbered consecutively from 1 through 27. A comparison of the prior art structures of FIG. 57 with the novel structure of FIG. 58 for the welded turret of the Leopard battle tank clearly shows the substantially simpler overall design. FIGS. 59 to 102 show the individual details, i.e. the individual major weld seams, once more to a larger scale, with FIGS. 59, 61, 63, 65, 67, 69, 71, 73, 75, 77, 79, 81, 83, 85, 87, 89, 91, 93, 95, 97, 99 and 101 showing the prior art structures for unlike base welding of the walls in the turret of the Leopard battle tank, while the respective, i.e. FIGS. 60, 62, 64, 66, 68, 70, 72, 74, 76, 78, 80, 82, 84, 86, 88, 90, 92, 94, 96, 98, 100 and 102, show the substantially simpler corresponding weld configurations for the respective major weld seams according to the invention.

Some characteristic information of the weld configurations shown in FIGS. 3 to 56 and 59 through 102 is shown in the Appendix in order to facilitate the comparison of the weld configurations according to the known method and according to the invention. This information should be considered merely as exemplary and is not obligatory within the scope of the the inventive idea (problem and solution).

Inasmuch as dimensions and drawing symbols are entered in the drawings, these are also intended to facilitate comparison of the major weld seams. This information, particularly the dimensions, is likewise to be considered only as examples and is not obligatory. Rather, these dimensions may change according to given conditions.

A comparison of FIGS. 1 and 2 already shows that the geometry of the weld seams has been substantially simplified by the use of the like-base welding method according to the invention. It can also be seen that the preferred seam is the V-type weld. This results in substantial advantages with respect to seam preparation. Mainly, such V-type welds can be dependably welded on a like base with comparatively small opening angles down to about 30°, whereas the opening angle of a V-type weld in the austenitic welding method must be at least 60°. This results in noticeable savings of filler material. Furthermore, there results a substantial reduction in internal weld strains.

The illustrations corresponding to the welding method according to the invention in FIGS. 3 through 56 and 59 through 102, i.e., the illustrations with the even numbers, show that with like-base welding of sheet metal or other bodies made of armor steel, the number of weld seams can generally be reduced to one weld seam. Although this sometimes results in a greater weld seam volume for the one existing weld seam, the seam preparation is substantially simplified in most cases. Moreover, welding one seam with a greater volume is generally more effective than producing a plurality of smaller weld seams which must essentially be made in the form of fillet welds.

Furthermore, the respective detail views illustrating the invention show clearly that the number of layers does not increase in proportion to the welding volume. This is so because a very large volume is introduced per layer of the weld seam. Moreover, as shown in the Appendix, the length of the seam, which is essentially determined by the structure at hand, changes only insignificantly from case to case. The stated costs (see Appendix) in each case refer to the structures used in prior art series production of the Marder armored personnel carrier and the Leopard battle tank, based on the data for austenitic welding. Consequently, the resulting costs for the welding method according to the invention are given in percent with reference to the costs of the prior art series for the Marder armored personnel carrier and the welded turret of the Leopard battle tank. In this way, it can be seen which savings in time and costs can be realized by the use of the novel welding method. The cited costs are influenced not only by a reduction of the welding times but mainly also by the fact that the like-base weld filler material is substantially more economical than the austenitic electrode. This is the reason, for example, why in spite of increased welding times, the costs per running meter can still be reduced, as for example in the weld connections shown in FIGS. 40, 42 and 44.

The weld connection shown in FIG. 4 on the pit of the Marder armored personnel carrier constitutes the connection between the nose plate and the engine compartment covering. It can be seen that this connection, which in the prior art embodiment shown in FIG. 3, consisted of two fillet welds, can be simplified to such an extent that only one V-type weld 1 need be made. This reduces the notch effect of the weld connection, which is quite considerable in a fillet weld due to the inevitably existing gap at the root. A further advantage of the novel structure is that the requirements [for accuracy] of the gap width to be maintained in this connection are not as great as in the fillet weld connection shown in FIG. 3. That means simplifications during assembly which again are reflected in lower costs.

The weld connection shown in FIG. 6 is again substantially simpler compared to the one shown in FIG. 5 so that there again result substantial economic advantages. The same applies to the connection according to FIGS. 16 and 48, 50.

Figure 16:
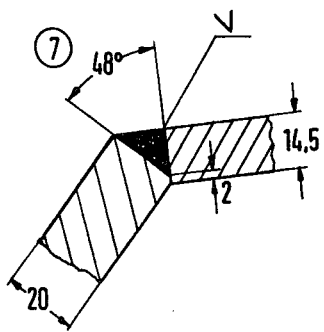
Figure 17:
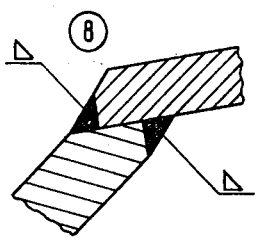
Figure 18:
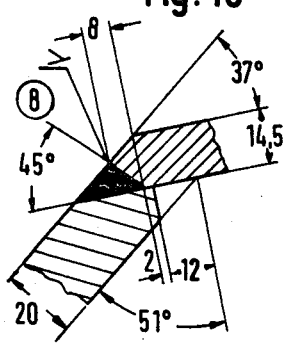
Figure 19:
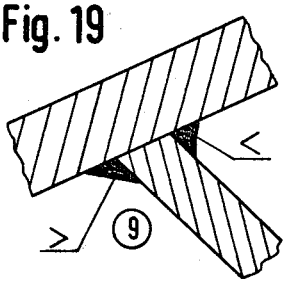
Figure 20:
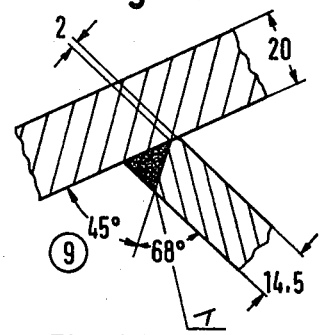
Figure 21:
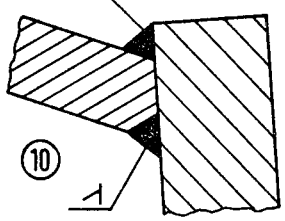
Figure 22:
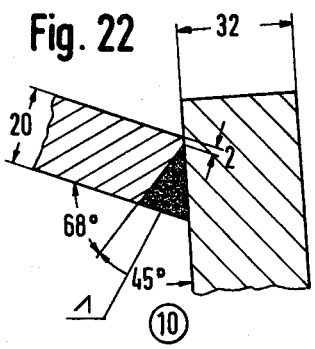
Figure 23:
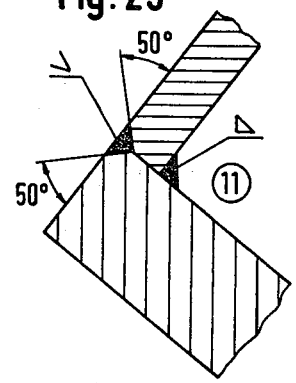
Figure 24:
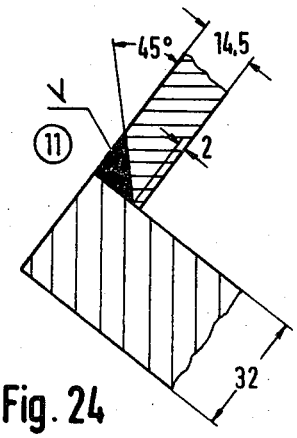
Figure 25:
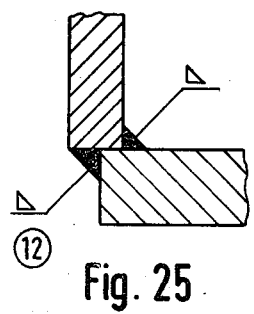
Figure 26:
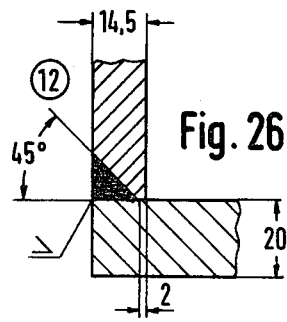
Figure 27:
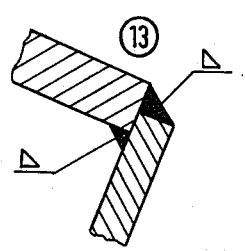
Figure 28:
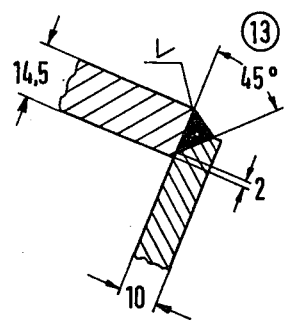
Figure 29:
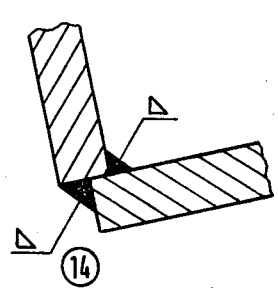
Figure 30:
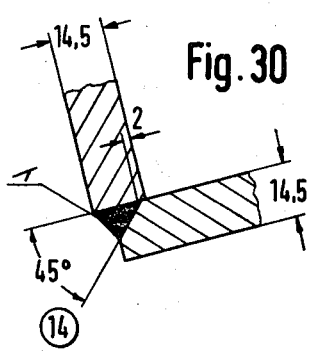
Figure 31:
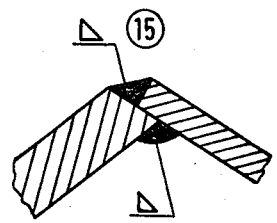
Figure 32:
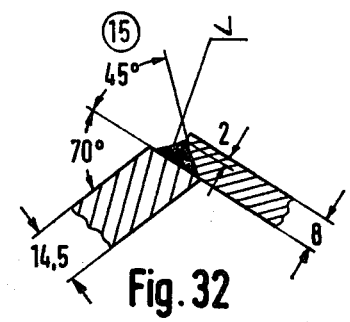
Figure 33:
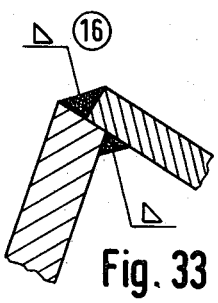
Figure 34:
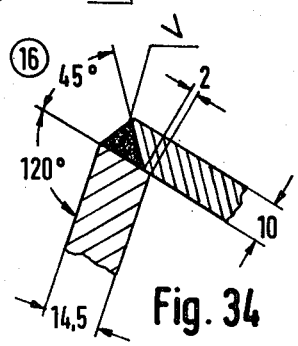
Figure 35:
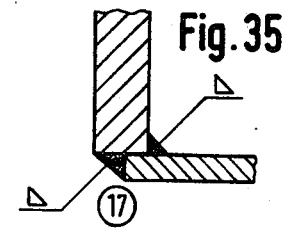
Figure 36:
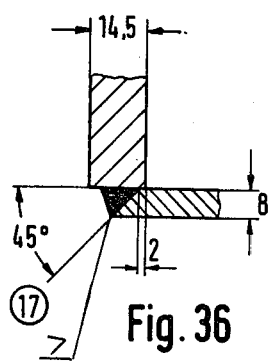
Figure 37:
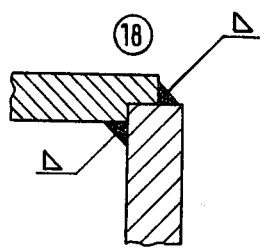
Figure 38:
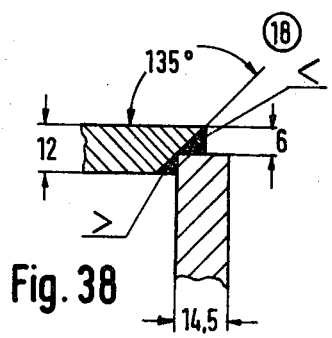
Figure 39:
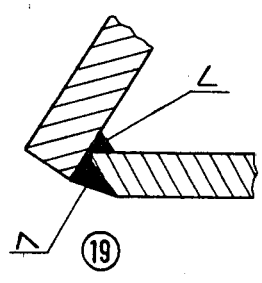
Figure 40:
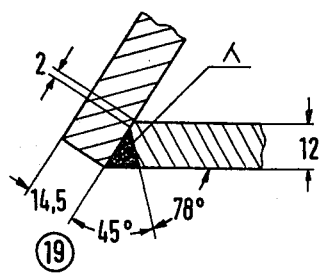
Figure 41:
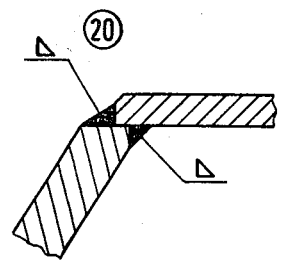
Figure 42:
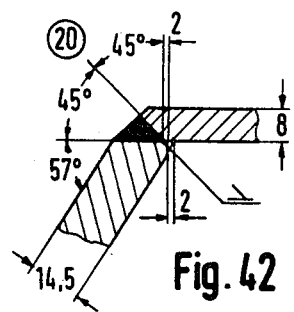
Figure 43:
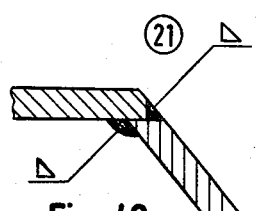
Figure 44:
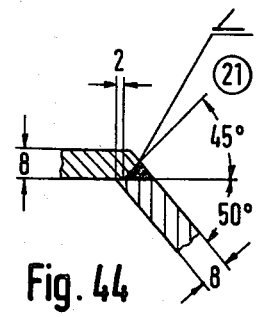
Figure 45:
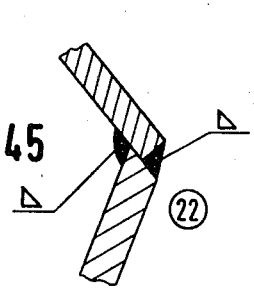
Figure 46:
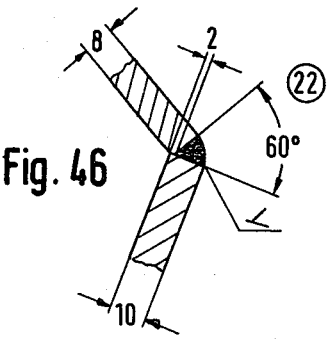
Figure 47:
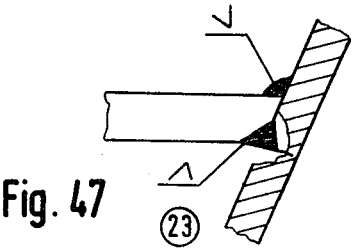
Figure 48:
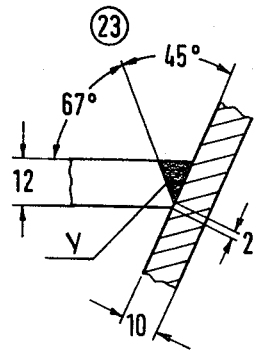
Figure 49:
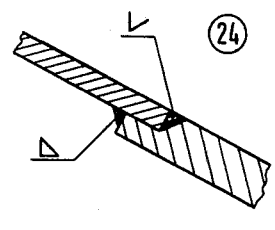
Figure 50:
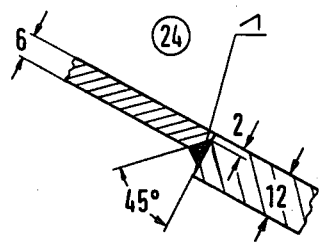
Figure 51:
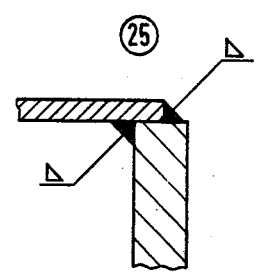
Figure 52:
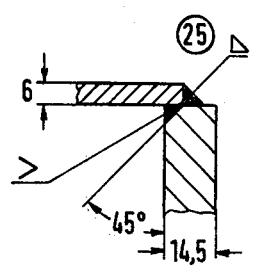
Figure 53:
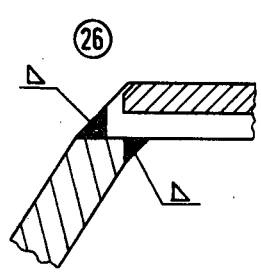
Figure 54:
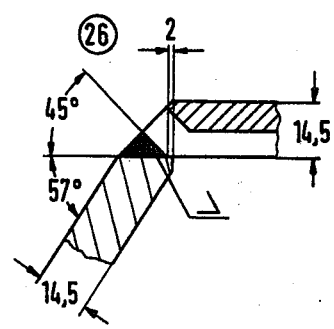
Figure 55:
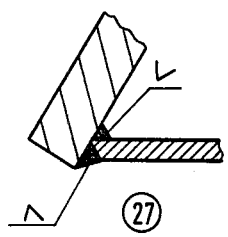

Regarding the other connecting points, the same applies essentially as that stated in connection with FIG. 4. It can easily be seen that most of the structural simplifications are the result that requirement for mutual support of the metal sheets to be welded together no longer exists and fillet welds can be avoided to a greater extent. Thus relatively simple V-type welds can be made. In many cases, this also results in a simplification of the weld seam preparation, as for example in the connection according to FIG. 8 compared to that of FIG. 7, FIG. 10 compared to FIG. 9, FIG. 12 compared to FIG. 11, FIG. 16 compared to FIG. 15, FIG. 38 compared to FIG. 37, FIG. 48 compared to FIG. 47 and FIG. 50 compared to FIG. 49.

A reduction of the notch effect, as described already for the connection according to FIG. 4, will result whenever fillet weld connections (FIG. 4 or 26) are avoided. The same effect also occurs if connections of the type of FIG. 19, i.e. shifting seam connections, or connections according to FIG. 11 or 13 are changed. The reduction in the notch effect is of great significance particulary when the structure is subjected to dynamic stresses—as in the case of the Marder pit—or is to be considered as a self-supporting, relatively thin-walled structure.

When compared with FIG. 57, the prior art structure of the welded turret on the Leopard tank, the system drawing of FIG. 58 shows clearly that sometimes quite complicatedly shaped profiled pieces, which were required at certain places for connecting and supporting metal sheets in view of the bulkhead structure, can be avoided when the method according to the invention is used. In the novel structure of the turret of the Leopard battle tank according to FIG. 58 as well, the preferred weld connection is the V-type weld, so that fillet weld connections and shifting seam connections are avoided. However, in view of the bulkhead design, the V-type weld cannot be used in all cases so that at some places fillet weld connections have to be used inevitably. These fillet weld connections, however, even if the like-base welding method according to the invention is employed, are in no way of a poorer quality than the corresponding embodiments with austenitic weld filler material.

Figure 59:
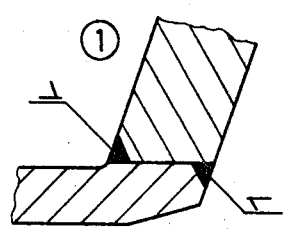
Figure 60:
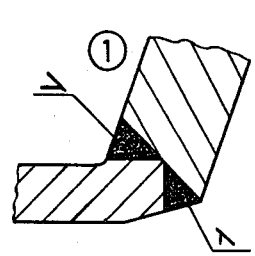
Figure 61:
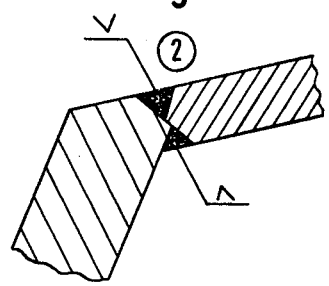
Figure 62:
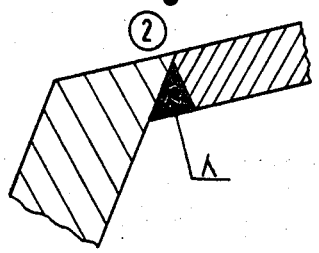
Figure 63:
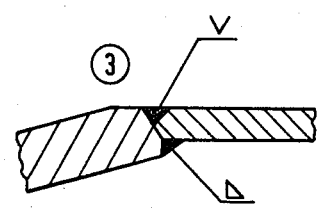
Figure 64:
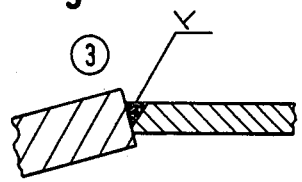
Figure 65:
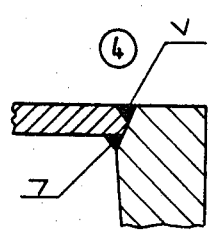
Figure 66:
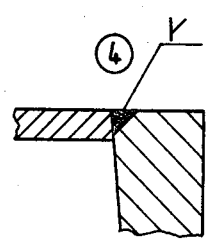
Figure 67:
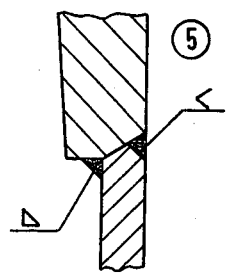
Figure 68:
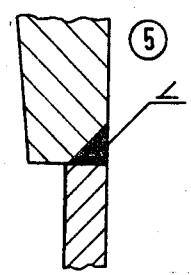
Figure 69:
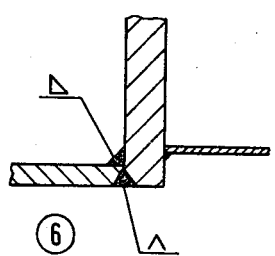
Figure 70:
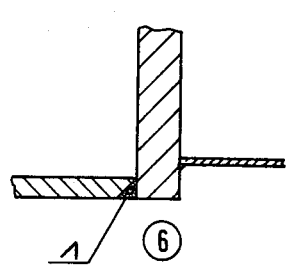
Figure 71:
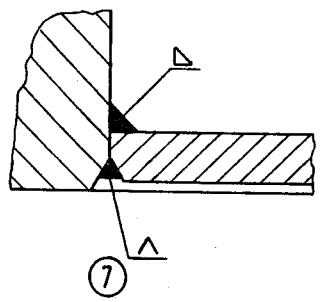
Figure 72:
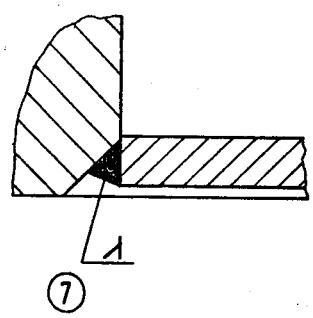

A comparison of the weld connection of FIG. 60 with that of FIG. 59 shows that the seam volume introduced is greater than in the prior art series structures of the welded turret of the Leopard. It can further be seen that, as a result, the required welding times increase. In spite of the substantially more economical weld filler material for the like-base welding method, the costs per running meter of seam increase for the structure of FIG. 60. Nevertheless, the novel structure as made possible by the method of the invention is worth recommending because substantial advantages are evident during assembly. For example, the very expensive fitting work required in the prior art series construction of the welded turret of the Leopard is no longer required since the like-base welding method of the invention permits gap welds with a gap width up to, for example, 2 mm. A further advantage of the novel structure of the invention is that the notch effect is reduced.

Furthermore, a reduction in the notch effect is realized in weld connections produced according to the invention as shown in FIGS. 64, 66, 68, 70, 80, 86, 88, 92, 96, 100 and 102.

In the novel structures produced according to the method of the invention, the internal weld strain can generally be reduced noticeably in contradistinction to the prior art structures. Examples of such weld connections are the seams in FIGS. 60, 64, 70, 72, 82, 96 and 102.

A particular advantage lies in the simplification of the assembly work by avoiding such structural designs which require precise fitting of the armor steel bodies to be connected. With the like-base welding method according to the invention for armor steels, the requirements regarding gap widths to be maintained are considerably lower than in the prior art methods employing austenitic weld filler materials. This fact, under simultaneous consideration of the modified structural design in the region of the seam, makes it possible, in the assembly of components and of the entire turret, to eliminate sometimes quite complicated fitting work. This applies particularly to the weld connections shown in FIGS. 60, 66, 68, 72, 80, 90 and 92.

Figure 77:
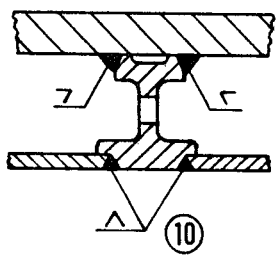
Figure 78:
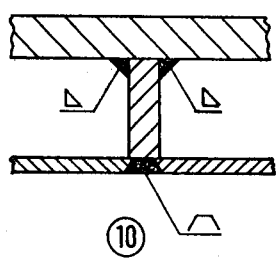
Figure 79:
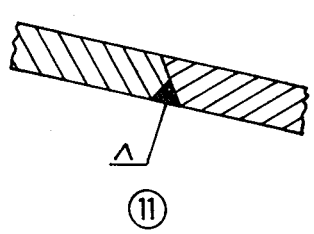
Figure 80:
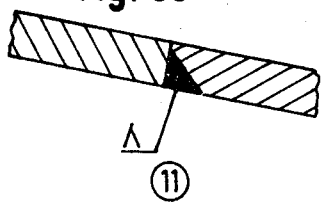
Figure 81:
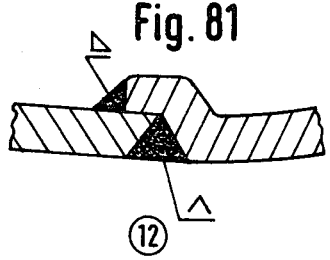
Figure 82:
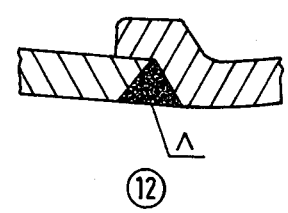
Figure 83:
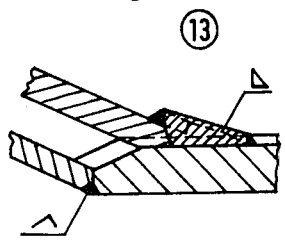
Figure 84:
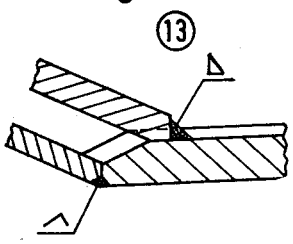
Figure 85:
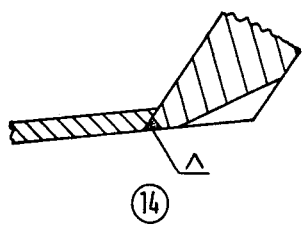
Figure 86:
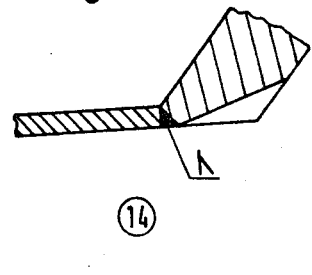
Figure 87:
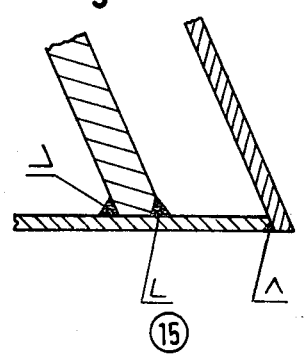
Figure 88:
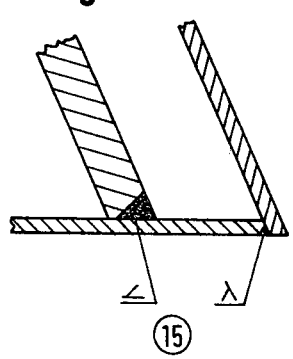
Figure 89:
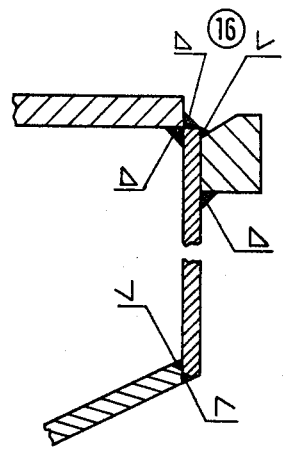
Figure 90:
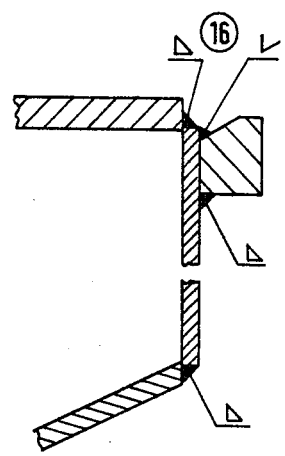
Figure 91:
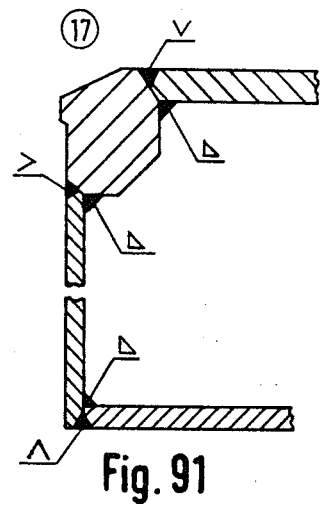
Figure 92:
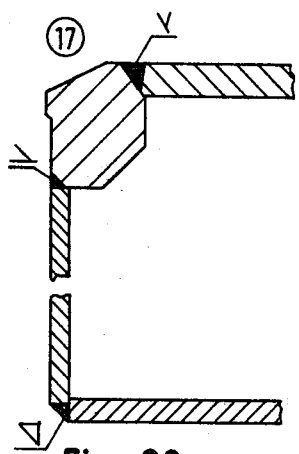
Figure 93:
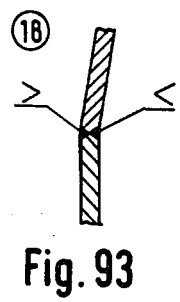
Figure 94:
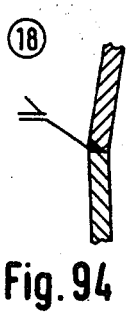
Figure 95:
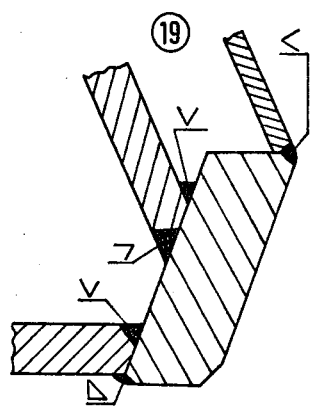
Figure 96:
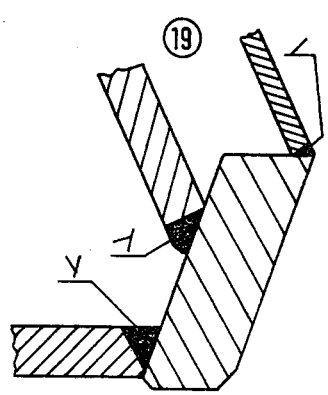
Figure 97:
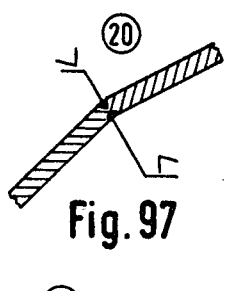
Figure 98:
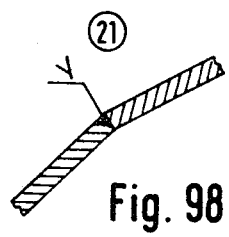

FIGS. 74, 76, 78, 84, 88, 96 and 102 show details which represent the bulkhead arrangement and the weld designs required to realize such arrangements. Special profiles are required for the embodiments of FIGS. 73, 75 and 77 so as to assure the required distance between the bulkheads under simultaneous assurance of the mutual support required for austenitic welding methods between the armor steel sheets or subassemblies made of armor steel which are to be connected together. In FIG. 77, the profiled piece is required to assure the spacing of the bulkheads and to permit a butt joint in the outer bulkhead with the required support. When the like-base welding method according to the invention is used, the profiled piece can be eliminated and the required spacing of the bulkheads can be assured by a simple sheet metal strip. The required butt joint in the outer bulkhead can be welded directly as such or—as shown in FIG. 78—can be welded as a seam between three pieces of sheet metal in simultaneous connection with the bar.

Figure 73:
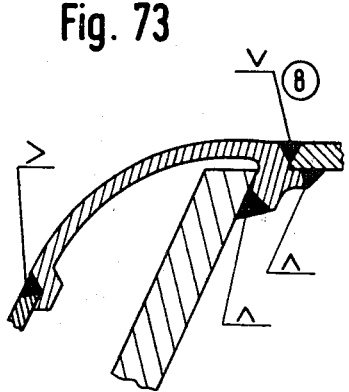
Figure 74:
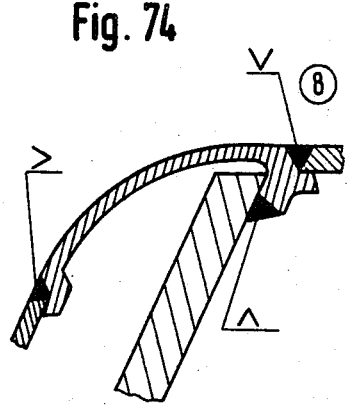

The profiled piece in FIG. 73 cannot be replaced by a simpler structural member even if the welding method of the invention is used. This is evident from a comparison between FIGS. 73 and 74 It has been found, however, that a weld seam of 1510 mm can be eliminated. Furthermore, in the novel weld structure of FIG. 74, when compared with the prior art structure of FIG. 73, there results a saving in time. A further reduction of costs results from the lower price for the electrodes employed in the like-base welding method.

Figure 75:
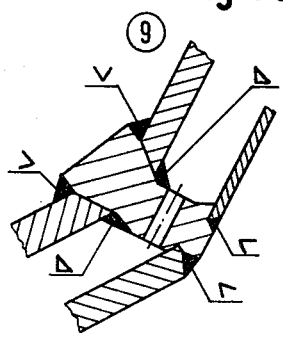

As can be seen in FIG. 75, the unlike-base welding of the welded turret of the Leopard requires a very complicated and heavy-weight profiled intermediate piece. This profiled intermediate piece serves numerous purposes which are necessary if an austenitic weld filler material is used for welded pit and turret housings. These are essentially the support of the armor steel sheets to be connected, the assurance of the bulkhead spacing and the partial covering of the weld seams. According to the invention, this intermediate piece can also be eliminated. This is quite evident from FIG. 76 in which two alternative solutions of the invention are shown. Here, the intermediate piece is replaced by a simple strip of armor steel sheet which need be welded only in part to the inner and outer bulkheads. The other partial functions can be eliminated if the like-base welding method according to the invention is used, so that support of the armor steel sheets or protection of the weld seams is no longer necessary. The alternative solution identified as "Proposal I" (see Appendix) is based on the conventional arrangement where a bar sheet of armor steel assures the spacing between outer bulkhead and inner bulkhead. The connection of the abutting bulkhead sheets is made with V-type seams in the manner which has already been described in detail. The fitting work, which is very costly with the use of profiled pieces, is reduced to a minimum in this proposal. The resulting internal weld strains are also reduced. The welding time required is reduced to 40 percent of the time required to weld the connections with the profiled piece and the unlike-base welding method.

Figure 76:
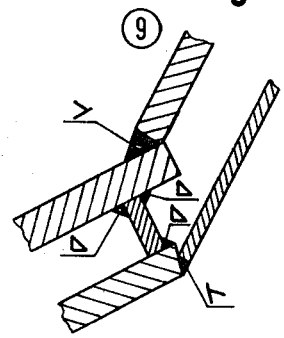

The alternative solution identified as "Proposal II" (see appendix) of FIG. 76, however, is different in structure from the conventional embodiment. In this case, the intermediate spacer piece can be eliminated, since the inner and outer bulkheads are welded directly to the inner bulkhead to the element to be connected. The spacing between the second, still to be attached, outer bulkhead, is produced in that the lower end is bent, while cold, about the required angle so that it can also be welded to the inner bulkhead. This structure is simpler. Although it does not produce the same savings in welding times as Proposal I, the times for manufacture of the bar sheet can be eliminated.

The profiled pieces shown in FIGS. 73, 74, 75 and 77 are made of armor steel and produced by extrusion molding. The costs for these profiles are high. If—as proposed by the invention—the majority of these expensive profiled pieces is eliminated, a noticeable reduction in costs can be realized.

With the use of the method according to the invention, no new devices need be produced. Rather, the same devices can be used for the like-base method of the invention as for the prior art austenitic welding. Hydraulic clamping devices for pressing together the parts to be welded can be eliminated in the majority of cases, since with like-base welding of armor steel according to the invention, gaps up to a considerable width, e.g. up to 3 mm, can be bridged without difficulty. The devices are here used merely for positioning and as holding devices.

In summary it can be noted that calculations have shown that with the use of the method according to the invention for producing the pit of the Marder armored personnel carrier a savings in costs for mass production of about 3 percent of the manufacturing costs can be realized. With reference to influenceable costs, i.e. costs for welding and electrodes, there even results a savings of about 22 percent.

In the welded turret housing for the Leopard battle tank a significantly greater portion of the costs can be influenced by the method of the invention since the influenceable costs for welding, electrodes and for normally employed profiles can here be influenced in principle. With the use of the method according to the invention, the resulting savings are about 6 percent with reference to the total costs of the two alternatives examined and shown in FIG. 76, the savings in profiles amounting to almost half. With reference to influenceable costs, the portion of the costs saved by use of the method according to the invention is about 20 percent.

Embodiments of the method according to the invention are also illustrated in FIGS. 103 to 106. There the reference numerals 28 and 29 show two armor steel sheets which are to be connected together and which form the armor steel bodies.

In the embodiments according to FIGS. 103 to 104, the armor steel sheets 28 and 29 are to be connected together by means of single-bevel butt welds 30. As is evident from FIGS. 103 and 104, the one armor steel sheet 29 is provided, in the region of the root, with an uninterrupted, contiguous bar 31 of unchanging height X. In the region of the root of the joint, a filler body in the form of an unalloyed wire 32 is disposed which, in the embodiment of FIG. 103, is supported by the walls of the joint so that it still lies above bar 31, while in the embodiment of FIG. 104, the filler body 32 is disposed between the bar 31 and the oppositely disposed wall of the other armor steel sheet 29. However, clamping in of this filler body 32 is not necessary.

In the embodiment of FIG. 105, the armor steel sheets 28 and 29 are to be connected together by a V-type weld 33. In the region of the root, both armor steel sheets are provided with an uninterrupted bar 34 or 35, respectively, each of unchanging height Z or T, respectively. The filler body 36 is again formed by an unalloyed wire which is disposed in the bottom of the joint in such a manner that it lies at least in part above the bars 34 and 35. If required, the filler body 36 may also be disposed between bars 34 and 35.

FIG. 106 is a schematic representation of the welding procedure. The armor steel sheets 28 and 29 which are arranged, for example, next to one another, and which have been appropriately prepared by flame cutting or the like in the region of the joint, are welded together according to the invention by welding device 37 which advances in the direction marked K. Even before the weld seam can cool to below 100° C., it is reheated by a following multiple-nozzle torch 38 to at least 450°.

The features discussed in the specification, claimed in the claims and illustrated in the drawings are significant for the invention individually as well as in any desired combinations.

The term "armor steel" used in the present application is understood to means all very hard or highly refined steels, which are used, for example, to armor objects. In particular, it is understood to mean steels which are used to armor armored vehicles. For example, the armor steel sheet may be made of steels having the following composition:

Armor steel sheets up to 60 mm thickness:
0.30 to 0.50% C
0.10 to 0.35% Si
0.55 to 0.85% Mn
1.20 to 1.70% Cr
0.50 to 0.80% Mo
0.30 to 0.70% Ni and
0.20 to 0.30% V.

For armor steel sheet of more than 60 mm thickness, the nickel content is increased to 1.5 to 3.5%.

APPENDIX

| FIG. No. | No. of Seams | No. of Layers | Length of Seam (m) | Time (Welding Only) | Costs (%) (Welding Only) | Remarks |
| --- | --- | --- | --- | --- | --- | --- |
| 3 | 1 + 1 | 2 + 2 | 1.35 + 1.35 | 62' + 62' | 100 | double-sided weld; fitting work |
| 4 | 1 | 3 | 1.35 | 42' | 34 | little notch effect; gap welding possible up to 2 mm; low welding stresses |
| 5 | 1 + 1 | 1 + 1 | 2.32 + 2.32 | 49' + 49' | 100 | double-sided weld |
| 6 | 1 | 1 | 2.32 | 33' | 37 | little seam preparation; less seam volume; gap welding possible up to 2 mm |
| 7 | 1 + 1 | 1 + 2 | 2.0 + 2.0 | 56' + 92' | 100 | double-sided weld; notch effect |
| 8 | 1 | 5 | 2.03 | 101' | 63 | little fitting work; gap welding possible up to 2 mm; little seam preparation |
| 9 | 1 + 1 | 3 + 1 | 3.3 + 3.3 | 129' + 66' | 100 | double-sided weld; extensive seam preparation |
| 10 | 1 | 2 | 3.3 | 63' | 38 | savings in weight; gap welding possible up to 2 mm |
| 11 | 1 + 1 | 1 + 1 | 2.0 + 2.0 | 38' + 38' | 100 | double-sided weld |
| 12 | 1 | 1 | 2.0 | 28' | 33 | |
| 13 | 1 + 1 | 1 + 1 | 2.0 + 2.0 | 28' + 28' | 100 | double-sided weld |

APPENDIX-continued

| FIG. No. | No. of Seams | No. of Layers | Length of Seam (m) | Time (Welding Only) | Costs (%) (Welding Only) | Remarks |
|---|---|---|---|---|---|---|
| 14 | 1 | 1 | 2.0 | 46' | 68 | |
| 15 | 1 + 1 | 1 + 1 | 0.2 + 0.2 | 6' + 6' | 100 | double-sided weld |
| 16 | 1 | 3 | 0.2 | 7' | 53 | little notch effect; gap welding possible up to 2 mm (= little fitting work) |
| 17 | 1 + 1 | 1 + 1 | 1.0 + 1.0 | 28' + 28' | 100 | double-sided weld |
| 18 | 1 | 3 | 1.0 | 33' | 54 | |
| 19 | 1 + 1 | 1 + 1 | 0.2 + 0.2 | 6' + 7' | 100 | double-sided weld |
| 20 | 1 | 3 | 0.2 | 7' | 49 | little notch effect; easy fitting |
| 21 | 1 + 1 | 2 + 2 | 0.35 + 0.35 | 10' + 10' | 100 | double-sided weld |
| 22 | 1 | 5 | 0.35 | 17' | 76 | little notch effect; easy fitting |
| 23 | 1 + 1 | 1 + 1 | 0.95 + 0.95 | 23' + 18' | 100 | double-sided weld |
| 24 | 1 | 3 | 0.95 | 32' | 74 | little notch effect; gap welding possible up to 2 mm (= little fitting work) |
| 25 | 1 + 1 | 1 + 1 | 1.86 + 1.86 | 52' + 26' | 100 | double-sided weld |
| 26 | 1 | 3 | 1.86 | 56' | 66 | little notch effect; gap welding possible up to 2 mm |
| 27 | 1 + 1 | 1 + 1 | 0.8 + 0.8 | 12' + 23' | 100 | double-sided weld simple seam preparation |
| 28 | 1 | 3 | 0.8 | 23' | 57 | little notch effect |
| 29 | 1 + 1 | 1 + 1 | 0.4 + 0.4 | 12' + 6' | 100 | double-sided weld; simple seam preparation |
| 30 | 1 | 3 | 0.4 | 11' | 56 | little notch effect |
| 31 | 1 + 1 | 1 + 1 | 0.2 + 0.2 | 3' + 3' | 100 | double-sided weld; simple seam preparation |
| 32 | 1 | 2 | 0.2 | 7' | 99 | little notch effect |
| 33 | 1 + 1 | 1 + 1 | 0.65 + 0.65 | 9' + 9' | 100 | double-sided weld; simple seam preparation |
| 34 | 1 | 3 | 0.65 | 18' | 90 | little notch effect |
| 35 | 1 + 1 | 1 + 1 | 3.34 + 3.34 | 52' + 26' | 100 | double-sided weld; simple seam preparation |
| 36 | 1 | 2 | 3.34 | 71' | 80 | little notch effect |
| 37 | 1 + 1 | 1 + 1 | 1.15 + 1.15 | 16' + 16' | 100 | very complicated seam preparation |
| 38 | 1 + 1 | 1 + 1 | 1.15 + 1.15 | 17' + 17' | 91 | easy fitting |
| 39 | 1 + 1 | 2 + 1 | 0.85 + 0.85 | 38' + 11' | 100 | double-sided weld |
| 40 | 1 | 3 | 0.85 | 32' | 47 | gap welding possible up to 2 mm (= little fitting work) |
| 41 | 1 + 1 | 1 + 1 | 4.0 + 4.0 | 72' + 72' | 100 | double-sided weld; easy seam preparation |
| 42 | 1 | 2 | 4.0 | 101' | 66 | little notch effect |
| 43 | 1 + 1 | 1 + 1 | 2.35 + 2.35 | 56' + 45' | 100 | double-sided weld; easy seam preparation |
| 44 | 1 | 2 | 2.35 | 33' | 30 | little notch effect |
| 45 | 1 + 1 | 1 + 1 | 2.4 + 2.4 | 46' + 34' | 100 | double-sided weld |
| 46 | 1 | 2 | 2.4 | 68' | 72 | little notch effect; gap welding possible up to 2 mm |
| 47 | 1 + 1 | 1 + 1 | 0.55 + 0.55 | 13' + 7' | 100 | double-sided weld |
| 48 | 1 | 2 | 0.55 | 14' | 64 | easy seam preparation; little notch effect; easy fitting |
| 49 | 1 + 1 | 1 + 1 | 0.6 + 0.6 | 4' + 9' | 100 | complicated seam preparation, double-sided weld |
| 50 | 1 | 1 | 0.6 | 8' | 53 | savings in weight |
| 51 | 1 + 1 | 1 + 1 | 5.1 + 5.1 | 72' + 72' | 100 | easy seam preparation |
| 52 | 1 + 1 | 1 + 1 | 5.1 + 5.1 | 61' + 72' | 76 | easy fitting |
| 53 | 1 + 1 | 1 + 1 | 2.0 + 2.0 | 28' + 28' | 100 | double-sided weld |
| 54 | 1 | 2 | 2.0 | 51' | 78 | little notch effect |
| 55 | 1 + 1 | 1 + 1 | 5.1 + 5.1 | 128' + 62' | 100 | double-sided weld |
| 56 | 1 | 1 | 5.1 | 62' | 29 | |
| 59 | 1 + 1 | 3 + 3 | 1.65 + 1.65 | 113' + 113' | 100 | high welding stresses complicated fitting |
| 60 | 1 + 1 | 5 + 4 | 1.65 + 1.65 | 200' + 180' | 148 | little notch effect; gap welding possible up to 2 mm |
| 61 | 1 + 1 | 4 + 3 | 1.6 + 1.6 | 204' + 122' | 100 | double-sided weld; complicated seam preparation |
| 62 | 1 | 5 | 1.6 | 260' | 69 | gap welding possible up to 2 mm |

APPENDIX-continued

| FIG. No. | No. of Seams | No. of Layers | Length of Seam (m) | Time (Welding Only) | Costs (%) (Welding Only) | Remarks |
|---|---|---|---|---|---|---|
| 63 | 1 + 1 | 2 + 2 | 1.85 + 1.6 | 110' + 75' | 100 | double-sided weld; high welding stresses; complicated seam preparation |
| 64 | 1 | 3 | 1.85 | 65' | 32 | little notch effect; gap welding possible up to 2 mm |
| 65 | 1 + 1 | 2 + 2 | 1.6 + 1.42 | 58' + 52' | 100 | double-sided weld; high welding stresses; complicated seam preparation and fitting |
| 66 | 1 | 3 | 1.42 | 75' | 64 | little notch effect; gap welding possible up to 2 mm |
| 67 | 1 + 1 | 3 + 3 | 1.65 + 1.65 | 98' + 88' | 100 | high welding stresses; much fitting work |
| 68 | 1 | 4 | 1.65 | 119' | 59 | one-sided weld; little notch effect; little seam preparation; gap welding possible up to 2 mm |
| 69 | 1 + 1 | 3 + 2 | 1.9 + 1.9 | 90' + 84' | 100 | high welding stresses and complicated fitting work |
| 70 | 1 | 2 | 1.9 | 52' | 26 | one-sided weld; gap welding possible up to 2 mm |
| 71 | 1 + 1 | 3 + 5 | 1.42 + 1.42 | 142' + 63' | 100 | high welding stresses and complicated fitting work |
| 72 | 1 | 5 | 1.42 | 119' | 52 | one-sided weld; little notch effect, gap welding possible up to 2 mm |
| 73 | 1 + 1 + 1 + 1 | 3 + 2 + 4 + 3 | 1.82 + 1.51 + 1.65 + 1.76 | 120' + 80' + 173' + 104' | 100 | double-sided weld; high welding stress |
| 74 | 1 + 1 + 1 | 3 + 4 + 4 | 1.82 + 1.76 + 1.65 | 42' + 64' + 100' | 47 | gap welding possible up to 2 mm |
| 75 | (see below) | | | | | |
| 76 | (see below) | | | | | |
| 77 | 2 + 2 | 3 + 3 | 0.57 + 0.64 | 65' + 73' | 100 | high welding stresses and much fitting work |
| 78 | 2 + 1 | 3 + 4 | 0.15 + 0.61 | 6' + 56' | 45 | extrusion-molded profile eliminated |
| 79 | 1 | 2 | 0.15 | 4' | 100 | much notch effect; complicated seam preparation |
| 80 | 1 | 3 | 0.15 | 7' | 150 | gap welding possible up to 2 mm |
| 81 | 1 + 1 | 1 + 3 | 0.55 + 0.55 | 14' + 33' | 100 | double-sided weld; high welding stress |
| 82 | 1 | 3 | 0.55 | 19' | 40 | little welding stress |
| 83 | 1 + 1 | 6 + 3 | 0.12 + 0.19 | 13' + 15' | 100 | double-sided weld; much notch effect |
| 84 | 1 + 1 | 4 + 3 | 0.12 + 0.19 | 6' + 7' | 46 | gap welding possible up to 2 mm |
| 85 | 1 | 2 | 0.45 | 16' | 100 | much notch effect; complicated seam preparation |
| 86 | 1 | 3 | 0.45 | 12' | 43 | gap welding possible up to 2 mm |
| 87 | 1 + 1 + 1 | 2 + 3 + 2 | 0.72 + 1.31 + 1.19 | 41' + 70' + 43' | 100 | double-sided weld; much notch effect |
| 88 | 1 + 1 | 5 + 2 | 1.31 + 1.19 | 102' + 20' | 79 | gap welding possible up to 2 mm |
| 89 | (see below) | | | | | |
| 90 | (see below) | | | | | |
| 91 | (see below) | | | | | |
| 92 | (see below) | | | | | |
| 93 | 1 + 1 | 1 + 1 | 0.55 + 0.55 | 11' + 11' | 100 | high welding stresses, complicated seam preparation |
| 94 | 1 | 2 | 0.55 | 15' | 62 | one-sided weld; gap welding possible up to 2 mm |
| 95 | (see below) | | | | | |
| 96 | (see below) | | | | | |
| 97 | 1 + 1 | 1 + 1 | 0.55 + 0.55 | 11' + 11' | 100 | high welding stress; complicated seam |

APPENDIX-continued

| FIG. No. | No. of Seams | No. of Layers | Length of Seam (m) | Time (Welding Only) | Costs (%) (Welding Only) | Remarks |
|---|---|---|---|---|---|---|
| 98 | 1 | 2 | 0.55 | 15' | 60 | preparation and fitting work one-sided weld, gap welding possible up to 2 mm |
| 99 | (see below) | | | | | |
| 100 | (see below) | | | | | |
| 101 | 2 + 1 | 4 + 5 | 1.42 + 1.06 | 216' + 170' | 100 | double-sided weld; complicated seam preparation |
| 102 | 1 + 1 | 4 + 7 | 1.16 + 1.12 | 141' + 136' | 72 | little notch effect; gap welding possible up to 2 mm |
| 75 | V 1 | 3 | 1.0 | 88' | | |
| | > 1 | 4 | 0.7 | 77' | | |
| | ⌂ 1 | 3 | 0.9 | 90' | | |
| | ⌂ 1 | 3 | 0.7 | 70' | 100 | high welding stresses; much notch effect and fitting work |
| | ⌐ 1 | 3 | 0.85 | 48' | | |
| | ⌐ 1 | 4 | 0.85 | 93' | | |
| 76 | (Proposal I) | | | | | |
| | V 1 | 5 | 1.05 | 115' | | |
| | ⌂ 1 | 3 | 0.36 | 13' | | |
| | ⌂ 1 | 3 | 0.36 | 13' | 40 | extrusion molded profile eliminated; gap welding possible up to 2 mm |
| | ⌂ 1 | 3 | 0.63 | 22' | | |
| | ⌐ 1 | 3 | 0.98 | 25' | | |
| | (Proposal II) | | | | | |
| | ∧ 1 | 5 | 1.05 | 125' | | extrusion molded profile eliminated; gap welding possible up to 2 mm |
| | ∧ 1 | 3 | 0.98 | 29' | 58 | |
| | ∧ 1 | 5 | 0.98 | 119' | | |
| 89 | ⌂ 1 | 1 | 0.4 | 10' | | |
| | ⌂ 1 | 2 | 0.4 | 19' | | |
| | V 1 | 1 | 0.48 | 10' | 100 | double-sided weld seam; high welding stress and complicated fitting work |
| | ⌂ 1 | 2 | 0.48 | 23' | | |
| | V 1 | 1 | 0.78 | 15' | | |
| | ∧ 1 | 1 | 0.78 | 17' | | |
| 90 | ⌂ 1 | 2 | 0.4 | 14' | | |
| | V 1 | 1 | 0.48 | 8' | 55 | gap welding possible up to 2 mm |
| | ⌂ 1 | 2 | 0.48 | 13' | | |
| | ⌂ 1 | 3 | 0.78 | 17' | | |
| 91 | V 1 | 2 | 0.62 | 31' | | |
| | ⌂ 1 | 2 | 0.62 | 30' | | |
| | > 1 | 2 | 0.64 | 23' | 100 | high welding stresses; complicated seam preparation and fitting work |
| | ⌂ 1 | 1 | 0.64 | 16' | | |
| | ⌂ 1 | 1 | 0.63 | 16' | | |
| | ∧ 1 | 2 | 0.63 | 45' | | |
| 92 | V 1 | 4 | 0.62 | 31' | 40 | one-sided weld; little notch effect, gap welding possible up to 2 mm |
| | ⌐ 1 | 2 | 0.64 | 18' | | |
| | ⌂ 1 | 3 | 0.63 | 22' | | |
| 95 | < 1 | 3 | 0.65 | 24' | | |
| | V 1 | 2 | 0.32 | 15' | | |
| | ⌐ 1 | 4 | 0.32 | 29' | 100 | double-sided weld; complicated seam preparation |
| | V 1 | 4 | 0.16 | 11' | | |
| | ⌂ 1 | 1 | 0.17 | 4' | | |
| 96 | < 1 | 2 | 0.65 | 17' | | |
| | ⌐ 1 | 5 | 0.32 | 28' | 76 | little notch effect; gap welding possible up to 2 mm |
| | V 1 | 5 | 0.16 | 18' | | |
| 99 | < 1 | 5 | 3.31 | 129' | | |
| | V 1 | 3 | 2.10 | 67' | 100 | double-sided weld; much notch effect, complicated seam preparation |
| | > 1 | 1 | 3.31 | 83' | | |
| | ⌐ 1 | 1 | 2.10 | 49' | | |
| 100 | ∧ 1 | 2 | 3.31 | 84' | 37 | gap welding possible up to 2 mm |
| | V 1 | 2 | 2.10 | 54' | | |

We claim:

1. Method for welding bodies made of very hard or highly refined armor steel, particularly objects to be armored against the penetration of projectiles, flying bodies, splinters or the like, characterized in that armor steel bodies (e.g. 28) arranged in juxtaposition with a gap (A) therebetween are provided, in the region of the root of the joint, with preferably one bar each (e.g. 31), and/or a filler body of, in particular, an unalloyed steel is arranged in the joint so as to cover the joint gap (A), whereupon the armor steel bodies (e.g. 28, 29) are welded together without preheating with a suitable ferritic welding material—of like base—under a protective gas atmosphere and after cooling of the weld seam from the welding heat to not less than 100° C., the weld seam is heated locally and progressively without any holding period to at least 450° C. and subsequently, without maintaining a certain ambient temperature and/or period of time, the weld seam is cooled to ambient temperature in air, or a like-base layer of armor is locally applied onto a wall of armor steel from a suitable ferritic welding material in that the welding area which has been cooled from the welding heat to no less than 100° C. is heated locally and progressively without any holding period to at least 450° C. and subsequently the weld region is cooled in air without maintaining a certain time period and only the last (uppermost) welded layer of the weld region is again locally reheated, before being cooled from the welding heat to below 100° C. to at least 450° C. without holding period and subsequently again cooled in air to ambient temperature without maintaining a certain time period and/or temperature.

2. Method according to claim 1, characterized in that the welding material is drawn smoothly over the welding base.

3. Method according to claim 1 or 2, characterized in that the welding is effected under a protective gas atmosphere of $CO_2$.

4. Method according to claim 3, characterized in that for a required interruption of the welding work, before the weld region is cooled from the welding heat to a temperature below 100° C., only the weld seam region or the weld region, respectively, is heated locally and progressively to at least 450° C. without a holding period whereupon the later to be continued further welding is effected mainly under $CO_2$.

5. Method according to claim 1, characterized in that the local heating to at least 450° C. is effected by a subsequent multiple-nozzle torch (38).

6. Method according to claim 1, characterized in that the armor steel bodies (e.g 28, 29) to be welded together are prepared by flame cutting in the joint region (30) and immediately thereafter these joint regions are stress-relieved by means of a progressively following burner—e.g. a multiple-nozzle torch.

7. Method according to claim 1, characterized in that the bodies to be welded together are provided with an uninterrupted bar (e.g. 31) at least on the side defining the weld joint (30).

8. Method according to claim 7, characterized in that the armor steel bodies (e.g. 28 or 29) to be welded together, if they have a thickness of less than 30 mm, are provided with bars (e.g. 34 or 35), of a height of about 1 to 3 millimeters (e.g. Z or T).

9. Method according to claim 7, characterized in that the armor steel bodies (e.g. 28 or 29) to be welded together, if they have a thickness of less than 30 mm, are provided with bars of a height of 2 millimeters (e.g. X).

10. Method according to claim 1 or 7, characterized in that the armor steel bodies (e.g. 28 or 29) to be welded together, if they have a thickness of no more than 30 mm, are arranged with a gap (A) between them of 0 to 3 mm.

11. Method according to claim 10, characterized in that the armor steel bodies (e.g. 28 or 29) to be welded together, if they have a thickness less than 30 mm, are arranged with a gap (e.g. A) of 2 mm between them.

12. Method according to claim 1, characterized in that the joint root or the bottom of the joint, respectively, is covered with the filler body (e.g. 32) without interruption.

13. Method according to claim 12, characterized in that a wire (e.g. 32) having a diameter which corresponds to the width of the gap (e.g. A) is inserted into the joint (e.g. 30) so as to form the filler body.

14. Method according to claim 12 or 13, characterized in that the welding is effected with a ferritic welding material having a low to very low creep limit.

15. Method according to claim 1, characterized in that the welding is effected with a welding material whose composition is adapted to the respective thickness of the armor steel bodies (e.g. 28 or 29) and the shape of the seam and has a low carbon content.

16. Method according to claim 1 or 15, characterized in that the armor steel bodies (e.g. 28 or 29) are welded by means of a tubular wire electrode of chromium-molybdenum alloy.

17. Method according to claim 1, characterized in that the armor steel bodies (e.g. 28 or 29) are welded by means of a rod electrode which has the following composition: 0.068% C; 0.37% Si; 1.38% Mn; 3.50% Cr; 0.89% Mo; 1.70% Ni and the preferably thin armor steel bodies of, e.g. no more than 15 mm thickness, are welded with this welding material.

18. Method according to claim 17, characterized in that the root layer of the armor steel bodies (e.g. 28 or 29) which are to be welded together is welded with a rod electrode of 4 mm diameter at 24 V and 170 A, while the filler layers are welded with a rod electrode of 5 mm diameter at 24 V and 220 A.

19. Method according to claim 1, characterized in that the armor steel bodies (e.g. 28 or 29) having a hardness up to about 120 $kp/mm^2$ are welded with a welding material of the following composition: a maximum of 0.5% C; 0.20 to 0.50% Si; 0.90 to 1.60% Mn; 0.40 to 0.80% Cr; 0.40 to 0.70% Mo; 2.3 to 2.7% Ni.

20. Method according to claim 1, characterized in that the armor steel bodies (e.g. 28 or 29) having a hardness of more than 120 $kp/mm^2$ are welded with a welding material of the following composition: a maximum of 0.5% C; 0.20 to 0.60% Si; 1.0 to 1.5% Mn; 2.50 to 3.50% Cr; 0.50 to 0.80% Mo; 1.5 to 2.5% Ni.

21. Method according to claim 1 or 20, characterized in that the welding of the bodies made of armor steel (e.g. 28 or 29) is effected with the use of protective gas wires having the following composition: 0.10% C; 0.30% Si; 1.2% Mn; 2.0% Cr; 0.60% Mo; 1.0% Ni.

22. Method according to claim 1, characterized in that the welding is effected with the use of a protective gas wire, particularly for welding of joints, of the following composition: 0.08% C; 0.80% Si; 1.8% Mn; 0.40% Cr; 0.55% Mo; 2.0% Ni.

23. Method according to claim 1, characterized in that, particularly for deposition and junction welding, the bodies made of armor steel (e.g. 28 or 29) are welded with the following protective gas wire: 0.15% C; 0.60% Si; 1.6% Mn; 5.5% Cr; 0.80% Mo.

24. Method according to claim 1, characterized in that, particularly for deposition or repair welding of bodies made of armor steel (e.g. 28 or 29), the welding is effected with a welding material of the following composition: 0.05 to 0.15% C, 0.30 to 0.60% Si; 1.3 to 1.9% Mn; 4.6 to 5.4% Cr; 0.60 to 1.10% Mo.

25. Method according to claim 20, 22 or 24, characterized in that the armor steel bodies (e.g. 28 or 29) are welded with a welding wire of 1.6 mm diameter, 26 V and 310 A.

26. Method according to claim 1, characterized in that the armor steel bodies (e.g. 28 or 29) having a thickness of about 6 to 10 mm are welded together by means of a tubular wire electrode having a diameter of 1.2 mm, armor steel bodies having a thickness of 10.1 to 20 mm are welded together by means of a tubular wire electrode having a diameter of 1.4 mm and armor steel bodies having a thickness of more than 20 mm are welded together by means of a tubular wire electrode having a diameter of 1.6 mm.

27. Method according to claim 1, characterized in that armor steel sheets of a thickness of 6 to 15 mm are welded together by means of a tubular wire electrode having a diameter of 1.2 mm, armor steel sheets having a thickness of 16 to 30 mm are welded together by means of a tubular wire electrode of 1.4 mm diameter and armor steel sheets having a thickness of 30 mm and more are welded together by means of a tubular wire electrode of 1.6 mm diameter, and the joints are filled, after welding of the root seam, by means of tubular wire electrodes which each have a larger diameter.

28. Method according to claim 1, 26 or 27, characterized in that during welding of the bodies (e.g. 28 or 29) a tubular wire electrode having a large to very large volume per welded bead is introduced into the respective welding joint (e.g. 30).

29. Method according to claim 1, characterized in that the respective weld seam is designed with as small a seam volume as possible.

30. Method according to claim 1 or 29, characterized in that when welding sheets made of armor steel with a thickness of 30 mm a seam cross section of 259 to 450 mm² is maintained.

31. Welded structure produced according to the method of claim 1, characterized in that all weld seams are produced without special armor steel coverings.

32. Welded structure according to claim 31, characterized in that the armor steel bodies (e.g. 28 or 29) are welded by means of V-type seams or double-V type seams with an opening angle of about 30° to 50° while for single bevel butt welds the opening angle is at least 45°.

33. Welded structure according to claim 31 or 32, characterized in that during welding of armor steel sheets of a thickness of 30 mm, a weld seam opening angle of 50°, there exist the following seam cross sections: single bevel butt seam 445 mm²; V-type seam 420 mm²; double-V type seam 210 mm².

34. Welded structure according to claim 31 or 32, characterized in that for the connection of armor steel sheets having a thickness of 30 mm by means of single level butt welds, V-type or double-V type seams, the seam cross section lie between 259 to 450 mm², the welding taking place in a $CO_2$ atmosphere.

35. Welded structure according to claim 31 or 32, characterized in that for welding of armor steel sheets of a thickness of 40 mm, the seam cross section is 580 mm².

* * * * *